US005768064A

United States Patent [19]
*Baasch et al.

[11] Patent Number: 5,768,064
[45] Date of Patent: Jun. 16, 1998

[54] ACTUATOR ARM ASSEMBLY HAVING A REMOVABLE ACTUATOR ARM

[75] Inventors: Holger Johan Baasch, Wabasha; Lowell James Berg, Rochester, both of Minn.; Alexander Gredinberg, San Jose, Calif.; Peter Maurice Herman, Oronoco, Minn.; Jerry Lee Neubauer, Stewartville, Minn.; John Ralph Reidenbach, Rochester, Minn.; Oscar Jaime Ruiz; Victor Wing Chun Shum, both of San Jose, Calif.

[73] Assignee: International Business Machines Corporation, Armonk, N.Y.

[*] Notice: The term of this patent shall not extend beyond the expiration date of Pat. No. 5,495,375.

[21] Appl. No.: 884,429

[22] Filed: Jun. 27, 1997

Related U.S. Application Data

[63] Continuation of Ser. No. 568,328, Dec. 6, 1995, abandoned, which is a continuation of Ser. No. 304,752, Sep. 12, 1994, Pat. No. 5,495,276.

[51] Int. Cl.⁶ ...................................................... G11B 5/55
[52] U.S. Cl. .......................................................... 360/106
[58] Field of Search ................................... 360/104–106

[56] References Cited

U.S. PATENT DOCUMENTS

| 4,698,709 | 10/1987 | Ihlenburg et al. | 360/104 |
|---|---|---|---|
| 4,893,205 | 1/1990 | Hoppe et al. | 360/104 |
| 4,943,875 | 7/1990 | Reidenbach et al. | 360/104 |
| 4,947,275 | 8/1990 | Hinlein | 360/104 |
| 5,012,367 | 4/1991 | Toensing | 360/104 |
| 5,062,018 | 10/1991 | Yaeger | 360/104 |
| 5,097,588 | 3/1992 | Fird et al. | 29/603 |
| 5,099,374 | 3/1992 | Ohkita et al. | 360/106 |
| 5,132,857 | 7/1992 | Russell-Smith et al. | 360/104 |
| 5,146,450 | 9/1992 | Brooks et al. | 369/244 |
| 5,187,626 | 2/1993 | Hopkins et al. | 360/104 |
| 5,296,984 | 3/1994 | Fick | 360/104 |
| 5,313,355 | 5/1994 | Hagen | 360/104 |
| 5,491,598 | 2/1996 | Stricklin | 360/106 |

FOREIGN PATENT DOCUMENTS

| 0428289 | 10/1990 | European Pat. Off. | G11B 5/55 |
|---|---|---|---|
| 0438806 | 12/1990 | European Pat. Off. | G11B 5/55 |
| 0564763 | 1/1993 | European Pat. Off. | G11B 5/48 |
| 0568965 | 5/1993 | European Pat. Off. | G11B 19/00 |
| 430831 | 2/1993 | Germany | G11B 5/48 |

OTHER PUBLICATIONS

"Self–Aligning Suspension to Arm Attachment by Rivets", IBM Technical Disclosure Bulletin, vol. 29, No. 1, Jun. 1986, pp. 256–257.

"Head Suspension Assembly Snap–in Mount (For Current Swage Mount)", IBM Technical Disclosure Bulletin, vol. 32, No. 8A, Jan. 1990, pp. 71–72.

B. M. Brue et al., "Head Bar Attachment", IBM Technical Disclosure Bulletin, vol. 30, No. 11, Apr. 1988, p. 397.

"Actuator Arm—Spindle Shaft Design", IBM Technical Disclosure Bulletin, vol. 33, No. 2, Jul. 1990, pp. 311–312.

*Primary Examiner*—A. J. Heinz
*Attorney, Agent, or Firm*—Paik Saber; Douglas R. Millett

[57] ABSTRACT

The improved disk drive system has an improved actuator arm assembly where the arms are independently and individually insertable and removable from the actuator member. Furthermore, each arm is individually self-locked into the actuator member without the need for external retaining means such as screws, springs, and rings. Since the arms are individually insertable/removable, the arms can be made very thin thereby allowing easy attachment of the head suspension assembly to the arm without the need for swaging, bonding, welding or screw-in. Since the arms can be made very thin, that provides substantial reduction in disk to disk spacing and therefore, substantial reduction in the overall height of a disk drive system.

32 Claims, 23 Drawing Sheets

SECTION A-A

SECTION Z-Z

SECTION X-X

SECTION W-W

SECTION V-V

SECTION X-X

ACTUATOR ARM ASSEMBLY HAVING A REMOVABLE ACTUATOR ARM

This application is a continuation of Ser. No. 08/568,328, filed Dec. 6, 1995, now abandoned which is a continuation of Ser. No. 08/304,752, filed Sep. 12, 1994 now U.S. Pat. No. 5,495,375.

BACKGROUND OF THE INVENTION

Technical Field

This invention relates in general to improvements in the field of magnetic disk drive systems which are also known as direct access storage devices (DASD), and are commonly referred to as disk drives. More particularly, this invention relates to a method and apparatus for attaching an individually and independently insertable and removable self-locking actuator arm in an actuator arm assembly in a disk drive system.

DESCRIPTION OF THE BACKGROUND ART

One of the most common methods of storing information at the present time is to utilize magnetic disk drive systems. Disk drive systems store information on tracks of rotatable magnetic recording disks. The disk drive industry has been driven by a continuing objective of producing magnetic disk drive systems of higher storage capacity in a given size known as "form factor". At the same time, the industry has been driven by the need to decrease the size of the disk drives, provide faster response time, and lower the cost of the disk drives.

One approach to increase the storage capacity of the disk drive is to increase the number of disks. However, as the number of disks increase, the physical height of the disk drive increases as well. Such an increase in height of a disk drive cannot be accommodated in a given form factor. To maintain the form factor and increase the number of disks at the same time, one must reduce the spacing between the disks. However, the space between each pair of disks in a given disk stack must be sufficient to accommodate an actuator arm (also referred to as mounting arm or arm) and one or two head suspension assemblies (also referred to as head gimbal assemblies which consist of heads mounted to a flexure) which are attached to the actuator arm. Therefore, the disk drive industry has been engaged in finding ways to reduce the disk to disk spacing by decreasing the thickness of the actuator arms, the size of head suspension assemblies, and the material and methods used to attach head suspension assemblies to an arm.

There are a number of methods which are commonly used in the disk drive industry to attach a head suspension assembly to an actuator arm to make an actuator arm stack. They are ball swaging, welding, bonding, bolting, and screw in. Although all these methods are well developed and are being used at the present time, when disk to disk spacing falls below 1.5 mm, ease of assembly, reworkability, and reduction of the components' size becomes crucial and in this regard, all these methods of attachment become impractical.

For example, the ball swaging technique involves swaging a spud made of a hard material into an actuator arm hole where the actuator arm is made of a soft material. During this process, a hard ball enlarges the spud cylinder thus forcing the outside surface of the spud cylinder into the inside surface of the actuator arm hole causing the outside surface of the spud cylinder to deform into the inside surface of the actuator arm hole.

However, in order for this method to work effectively, the arm must be thick enough to have sufficient rigidity and strength to withstand this attachment process. Furthermore, the thickness of the arm must be sufficient to accommodate the height of the spud. These requirements directly limit how thin an actuator arm can be made which consequently limits how far disk to disk spacing can be reduced.

Another common method is to use one or more screws to attach the head suspension assembly to an arm. However, this method also suffers from several drawbacks such as (1) additional space required to accommodate the screws; (2) additional cost associated with screws; and (3) added manufacturing process.

U.S. Pat. No. 5,062,018 shows a swaged head arm mounting arrangement consisting of an E-block actuator with a plurality of platforms (actuator arms) and plurality of flexure arms (load beams) where a shape-memory alloy material, preferably in a form of a coupling tube, is used to attach the flexure arms to their associated platforms. In this type of attachment, however, in order to insert or remove any flexure arm from its associated platform, freon has to be sprayed into the tube to transform the tube to its martensitic phase and then withdraw the tube.

U.S. Pat. No. 5,132,857 shows a head carrier for carrying a plurality of head/arm assemblies where the head carrier provides the head/arm assemblies with the correct orientation for assembly to the actuator mechanism of a disk file. Here the head carrier loaded with the head/arm assemblies is presented to the actuator so that the bevelled tail portion of each arm locates in a corresponding slot, which comprises two "V" shaped grooves in facing side members in the actuator mechanism. In this type of attachment, however, once the arm is in place, clamping bolts are necessary to secure the head/arm assemblies.

U.S. Pat. No. 4,943,875 shows a head/arm assembly where a mounting band is used to secure the head suspension assembly to an actuator arm. In this design, the arm has to be made from a very rigid material so it can withstand mounting and dismounting of the band. The requirement for rigidity limits how thin the actuator arm can be made. Furthermore, the disk to disk spacing has to be wide enough to further accommodate twice the mounting band thickness. This dependency further limits how far disk to disk spacing can be reduced.

U.S. Pat. No. 5,313,355 shows a flexure mounting scheme for hard disk drives where flexure is attached to a mounting plate by welding. The mounting plate has a pair of legs which engage with a pair of slots formed in the lateral surfaces of an actuator arm. However, in this scheme, the disk to disk spacing is limited by the height of the arm which in turn is directly proportional to the size of the slots.

Examples of other means and methods of attaching head suspension assemblies to an actuator arm are further shown in the following references: European Patent Application 438,806, published Jul. 31, 1991; U.S. Pat. No. 5,187,626, issued Feb. 16, 1993; U.S. Pat. No. 4,947,275, issued Aug. 7, 1990; U.S. Pat. No. 5,097,588, issued Mar. 24, 1992; U.S. Pat. No. 5,146,450, issued Sep. 8, 1992; U.S. Pat. No. 4,698,709, issued Oct. 6, 1987; U.S. Pat. No. 5,012,367, issued Apr. 30, 1991; U.S. Pat. No. 4,893,205, issued Jan. 9, 1990; IBM Technical Disclosure Bulletin Vol. 29, No. 1, June 1986, p. 256; IBM Technical Disclosure Bulletin Vol. 32, No. 8A, January 1990, p. 71; IBM Technical Disclosure Bulletin Vol. 30, No. 11, April 1988, p. 397.

As disk to disk spacing becomes smaller, the actuator arms must be made thinner which means conventional methods of attaching head suspension assemblies to actuator arms becomes impractical. The actuator arm can be made very thin if the head suspension assembly is permanently bonded or spot welded to the actuator arm. Bonding or spot welding is a very desirable method of attachment. However, if head suspension assemblies are permanently attached to the actuator arms, then under the current actuator designs where actuator arms are an integrated part of an actuator, the complete actuator assembly has to be discarded even if a single head suspension assembly is defective or damaged. This would be prohibitively expensive. Therefore, an invention is needed to provide substantial reduction in disk to disk spacing in disk drive systems and at the same time provide a low cost method and apparatus for individually repairing and replacing head suspension assemblies.

SUMMARY OF THE INVENTION

It is therefore an object of the present invention to provide an improved magnetic disk drive system.

It is a further object of the present invention to provide an improved magnetic disk drive system having actuator arms that fit in between the disks of the disk stack assembly.

Another object of the present invention is to provide an improved disk drive system having actuator arms that are individually and independently insertable and removable from the actuator member to allow reworkability of the arm and head suspension assemblies.

It is yet a further object of the present invention to provide an improved disk drive system having actuator arms that are individually self-locking.

The foregoing objects are achieved by the invention disclosed herein. Briefly, the improved magnetic disk drive system has an improved actuator arm assembly comprising an actuator member and a plurality of self-locking arms. The actuator member comprises a plurality of horizontal grooves and a longitudinal bore. Each arm has a self-locking means which allows every single arm to be individually and independently inserted into a horizontal groove of the actuator member and locked in place without any need for ball swaging, welding, bonding or using any other retaining means such as clips, rings, screws or any other similar means. The arms are further individually and independently unlocked and removed from the actuator member. Each arm also has an attachment portion for attaching a plurality of head suspension assemblies to said arm.

The invention disclosed here provides a method to replace the damaged or defective head suspension assembly, by providing a method and means for allowing every arm in the actuator arm assembly to be individually and independently insertable and removable. For the arm to be able to be individually and independently insertable and removable it means that each arm has to have its own independent locking means. To ensure that the overall mass and inertia of the actuator arm assembly is not increased, and to eliminate the need for retaining means such as ball swaging, welding, bonding, or external retaining means such as clips, rings, and screws every single arm has a self-locking means.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best presently contemplated mode of carrying out the invention. This description and the number of alternative embodiments shown is made for the purpose of illustrating the general principle of the present invention and is not meant to limit the inventive concepts claimed herein.

Figure 1A:
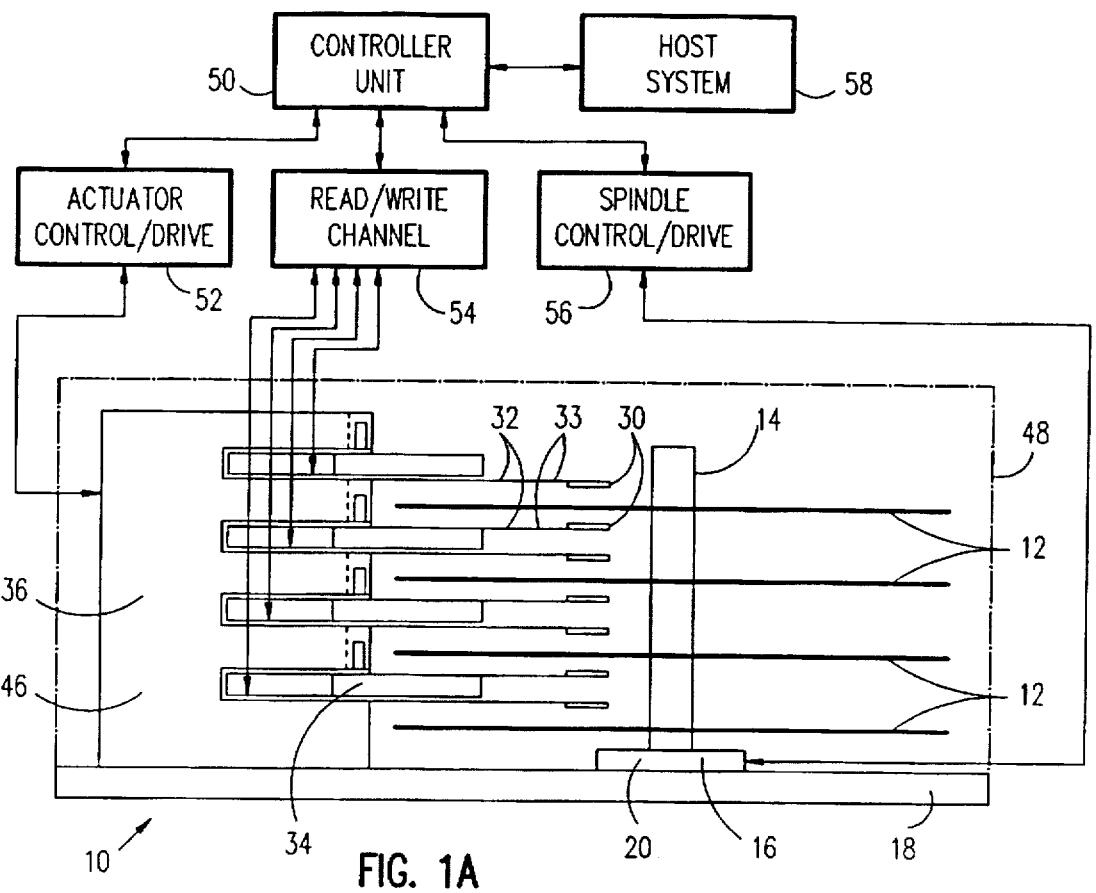
FIG. 1A is a schematic diagram of a disk storage system of the present invention.
Figure 1B:
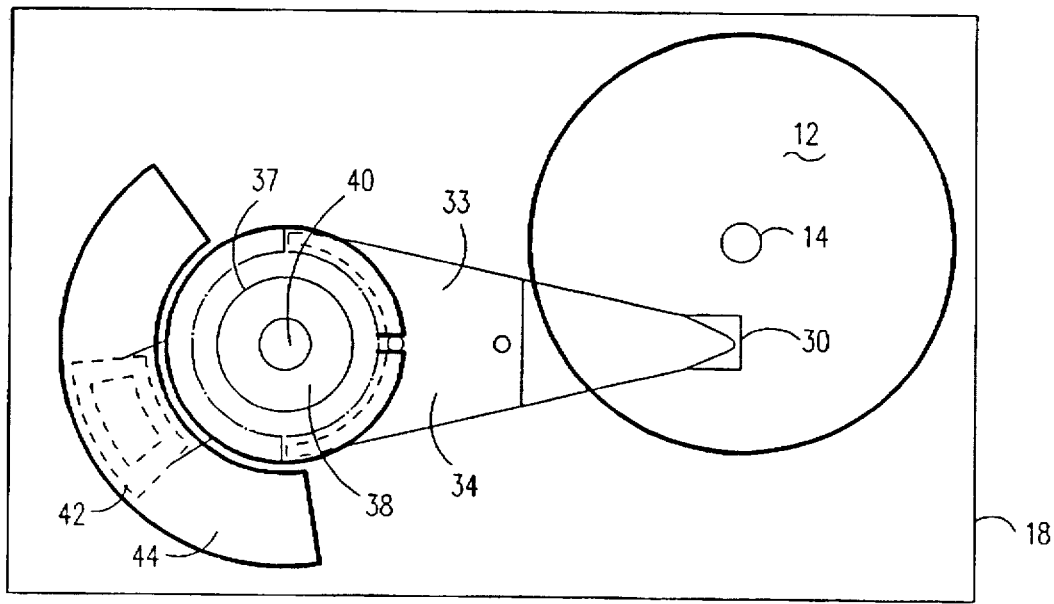
FIG. 1B is a top view of a portion of the disk storage system shown in FIG. 1A.

FIGS. 1A and 1B show a schematic diagram and top view, respectively, of a disk drive system 10 of the present invention. Now referring mainly to FIGS. 1A and 1B, the disk drive system 10 comprises a plurality of magnetic recording disks 12. Each disk 12 has a plurality of concentric data tracks. Disks 12 are mounted on a spindle shaft 14 which is connected to a spindle motor 16. Spindle motor 16 is mounted on a chassis 18. The disks 12, spindle shaft 14, and spindle motor 16 comprise a disk stack assembly 20.

A plurality of read/write heads 30 are positioned over the disks 12 such that each surface of the disks 12 has a corresponding read/write head 30. Each head 30 is attached to one of a plurality of suspensions 32. The head 30 and suspension 32 together form a head suspension assembly 33. Head suspension assemblies 33 are in turn attached to a plurality of self-locking arms 34. Self-locking arms 34 are connected to a rotary actuator member 36. It should be noted that although a rotary actuator member is shown, the invention described herein is also applicable to linear actuators.

Actuator member 36 typically comprises a bore 37, rotating on a bearing member 38 about a shaft 40 where the shaft 40 is mounted on the chassis 18, an actuator coil 42, and magnets 44. Actuator member 36 moves the head in a radial direction across the disks 12. The self-locking arm 34 and the actuator member 36 comprise an actuator arm assembly 46. The disk stack assembly 20 and the actuator arm assembly 46 are sealed in an enclosure 48 (shown by dashed line in FIG. 1A) which provides protection from contamination.

A controller unit 50 provides overall control to the disk drive system 10. Controller 50 typically comprises a central processing component and a memory component. Controller 50 is connected to an actuator control/drive 52 which in turn is connected to the actuator member 36. Through actuator control/drive 52, controller 50 controls the movement of heads 30 over disks 12. The controller 50 is further connected to a read/write channel 54 which in turn is connected to the heads 30. This allows controller 50 to send and receive data from the disks 12. The controller 50 is also connected to a spindle control/drive 56 which in turn is connected to the spindle motor 16. This allows controller 50 to control the rotational speed of disks 12. A host system 58, which is typically a computer system, is connected to the controller 50. Host system 58 may send digital data to controller 50 to be stored on disks 12 or may request that digital data be read from the disks 12 and sent to the host system 58. The basic operation of disk drive systems is well-known in the art and is described in detail in Magnetic Recording Handbook, Dennis Mee & Eric Daniel, McGraw-Hill Book Company, 1990.

Figure 2:
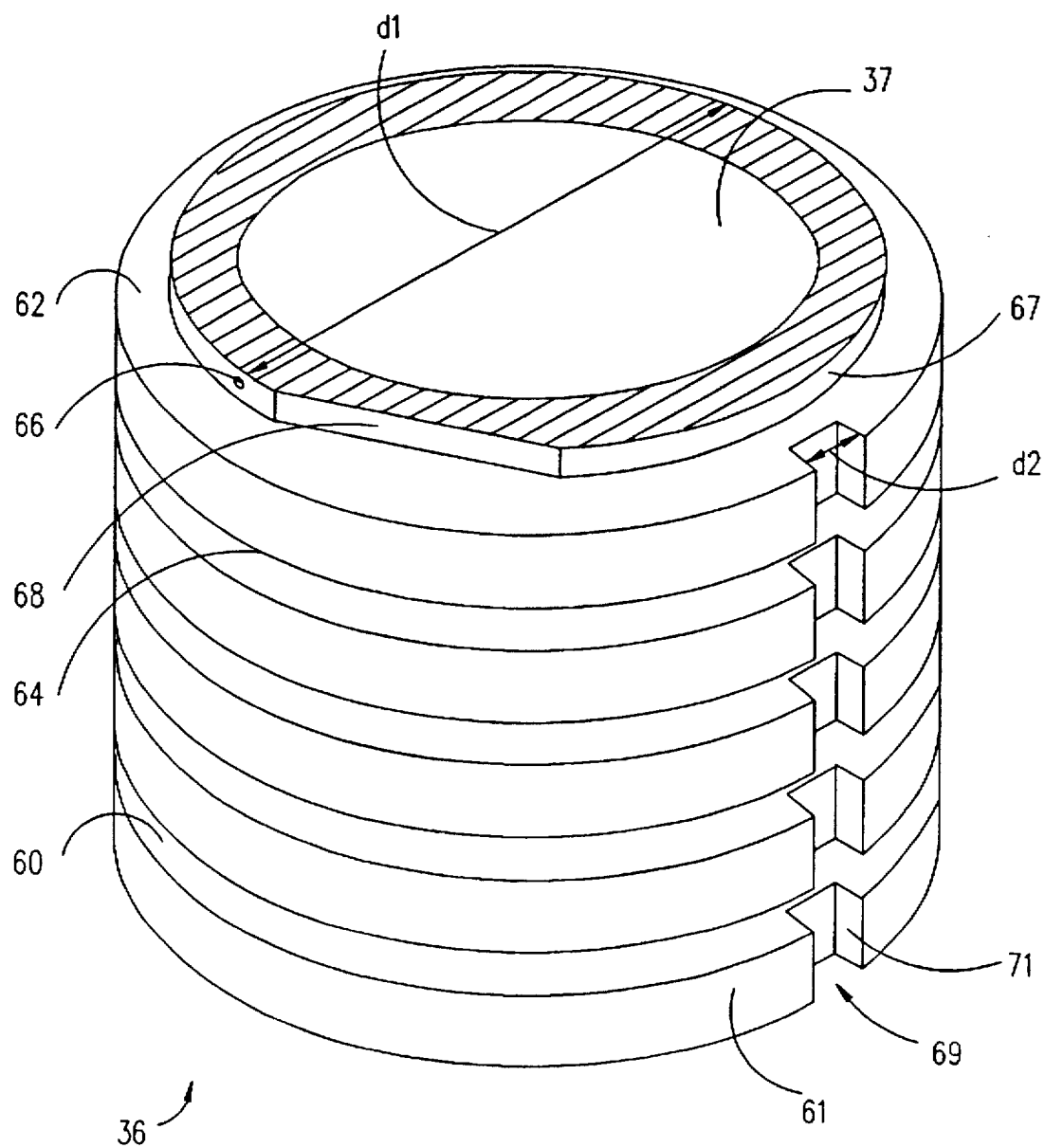
FIG. 2 is a perspective cross sectional view of an actuator member of the present invention.

FIG. 2 shows a perspective view of the actuator member 36 of the present invention. The actuator member 36 comprises a plurality of horizontal grooves 60 having a predetermined height. The horizontal grooves 60 are preferably formed within the circumference 61 of the actuator member 36 and are concentric. In the preferred embodiment, the horizontal grooves 60 comprises a bottom surface 62, a top surface 64, and a vertical surface 66 where the vertical surface 66 forms a circular wall 67 having a diameter d1 within the actuator member 36. In the preferred embodiment, a tangential cut 68 is formed in the vertical surface 66 of the horizontal groove 60 to ease the insertion and removal of the self-locking arm 34. The actuator member 36 further comprises at least one vertical groove 69 having side walls 71 substantially facing each other where the distance between the side walls 71 is d2. The actuator member 36 further includes a longitudinal bore 37.

Figure 3:
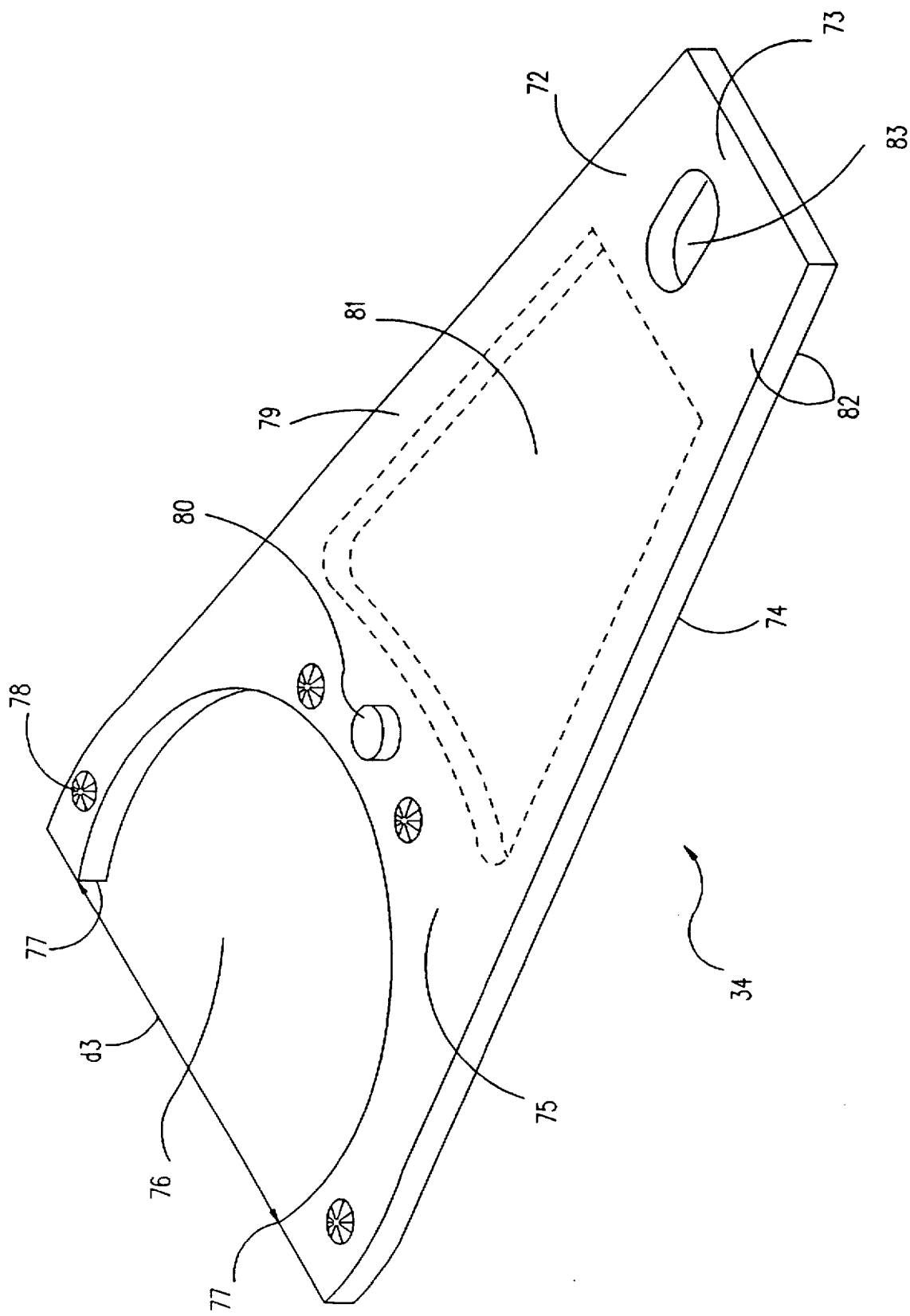
FIG. 3 is a perspective view of a self-locking arm of the present invention.

FIG. 3 shows a perspective view of the self-locking arm 34 of the present invention. The self-locking arm 34 comprises a top side 72, a bottom side 74, a front end portion 73, and a rear end portion 75. The rear end portion 75 incorporates a C-shaped opening 76 where the C-shaped opening 76 has first and second ends 77. The distance d3 between the ends 77 is smaller than the diameter d1 of the circular wall 67 by a predetermined amount. The rear end portion 75 is adapted to fit within the horizontal groove 60 of the actuator member 36. Extending from the rear end portion 75 toward the front end portion 73 is a trapezoidal-shaped portion 79 incorporating a large aperture 81 (shown by dashed line in FIG. 3). In the preferred embodiment, an alignment hole 83 is incorporated in the front end portion 73 to ensure precise alignment between the arm 34 and the head suspension assembly 33 during the attachment process. In the preferred embodiment, a pair of skin sheets 82 are further attached to the top side 72 and the bottom side 74. The skin sheets 82 substantially cover the top side 72 and the bottom side 74. The skin sheets 82 which may be part of a suspension load beam (not shown) are either spot welded or bonded to the self-locking arm 34 thereby creating a stiff self-locking arm 34 with a minimum mass and moment of inertia and with high torsional and in-plane bending stiffness. The self-locking arm 34 further comprises a plurality of dimples 78 which are formed on the top side 72 at a predetermined distance from the C-shaped opening 76. At least one boss 80, also known as an alignment means, is mounted on the top side 72 at a predetermined distance from the C-shaped opening 76. The boss 80 is substantially perpendicular to the longitudinal axis of the self-locking arm 34. The boss 80 is designed to mate with the vertical groove 69 of the actuator member 36.

Figure 4:
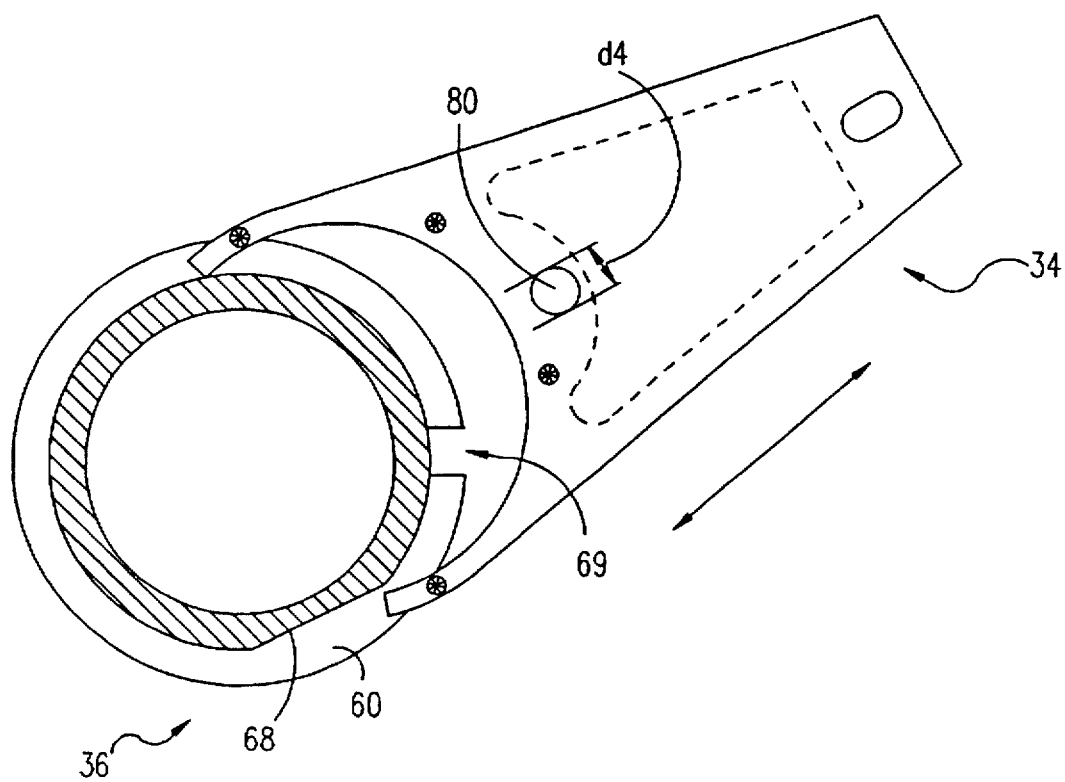
FIG. 4 is a top cross-sectional view of the actuator member of FIG. 2 and the self-locking arm of FIG. 3 prior to locking.
Figure 5:
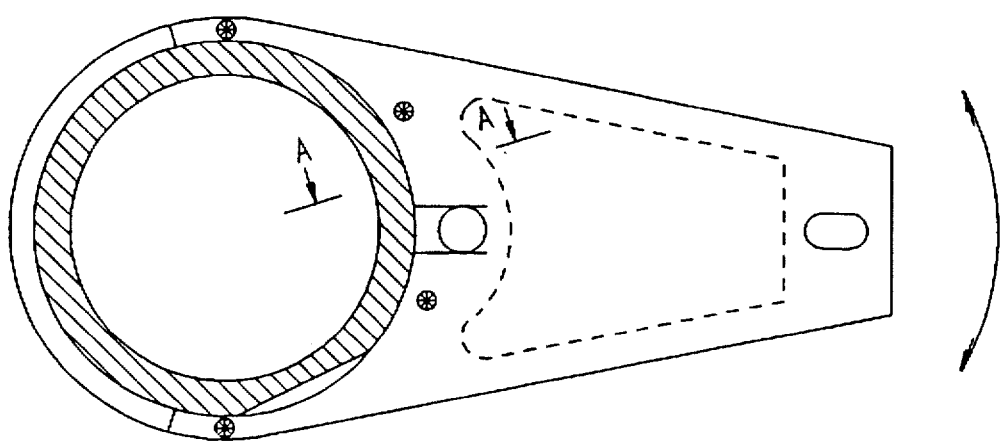
FIG. 5 is a top cross-sectional view of the actuator member of FIG. 2 and the self-locking arm of FIG. 3 in the locked position.

It should be noted that although the plurality of the dimples 78 and the boss 80 are shown to be formed on the top side 72 of the self-locking arm 34, it would be obvious to one skilled in the art that the dimples 78 and the boss 80 could as well be mounted on the bottom side 74 of the self-locking arm 34. FIGS. 4 and 5 show a top view of the self-locking arm 34 and the actuator member 36 prior to and after locking the self-locking arm 34 into a horizontal groove 60 of the actuator member 36, respectively. Now referring mainly to FIGS. 4 and 5, in order to lock the arm 34 into the actuator member 36, the C-shaped opening 76 is inserted into a horizontal groove 60 along the tangential cut 68 and then the arm is rotated clockwise until the boss 80 is aligned with the vertical groove 69 which at that point the arm 34 is pushed, along its longitudinal axis, toward the actuator member 36 until the boss 80 is firmly engaged inside the vertical groove 69. The arm 34 is unlocked and removed by pulling the arm 34, along its longitudinal axis, away from the actuator member 36 until boss 80 is disengaged from vertical groove 69 and then the arm 34 is turned counterclockwise and removed. In the preferred embodiment, the width of the boss 80, d4, is larger than the width d2 of the vertical groove 69 to provide interference sufficient to prevent lateral motion of the arm 34 in the locked position. Also, the distance d3 between the first and second ends 77 of the C-shaped opening 76 is selected to be smaller by a predetermined amount than the diameter d1 of the circular wall 67. Therefore, when the arm 34 is locked inside the horizontal groove 60, the first and second ends 77 of the C-shaped opening 76 are pushed outwardly by the circular wall 67 thereby creating a substantial retention force in the longitudinal direction.

Figure 6:
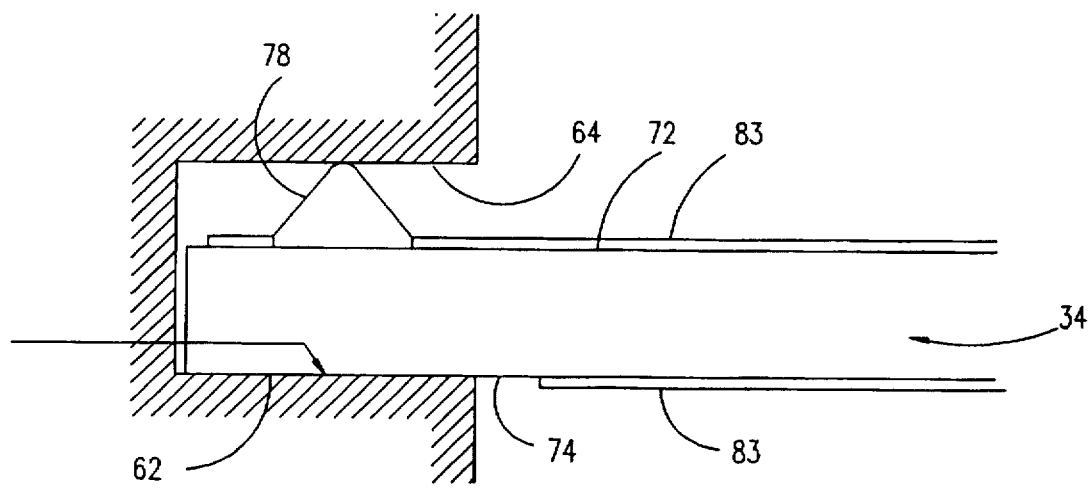
FIG. 6 is a side view of cross-section A—A of FIG. 5.

FIG. 6 is a side view of the cross-section A—A of FIG. 5 which shows that the registration of the self-locking arm 34 is provided by the bottom surface 62 of the horizontal groove 60. Accurate registration is provided by the plurality of dimples 78 which are mounted on the top side 72 of the self-locking arm 34. The dimples 78, having spring type characteristics, press the bottom side 74 of the arm 34 against the bottom surface 62 of the horizontal groove 60 thereby creating resistance to vertical motion. Although in the preferred embodiment, the registration of the self-locking arm 34 is provided by the bottom surface 62 of the horizontal groove 60, it would be obvious to one skilled in the art that the registrations of the self-locking arm 34 could also be provided by utilizing the top surface 64 of the horizontal groove 60.

Figure 7:
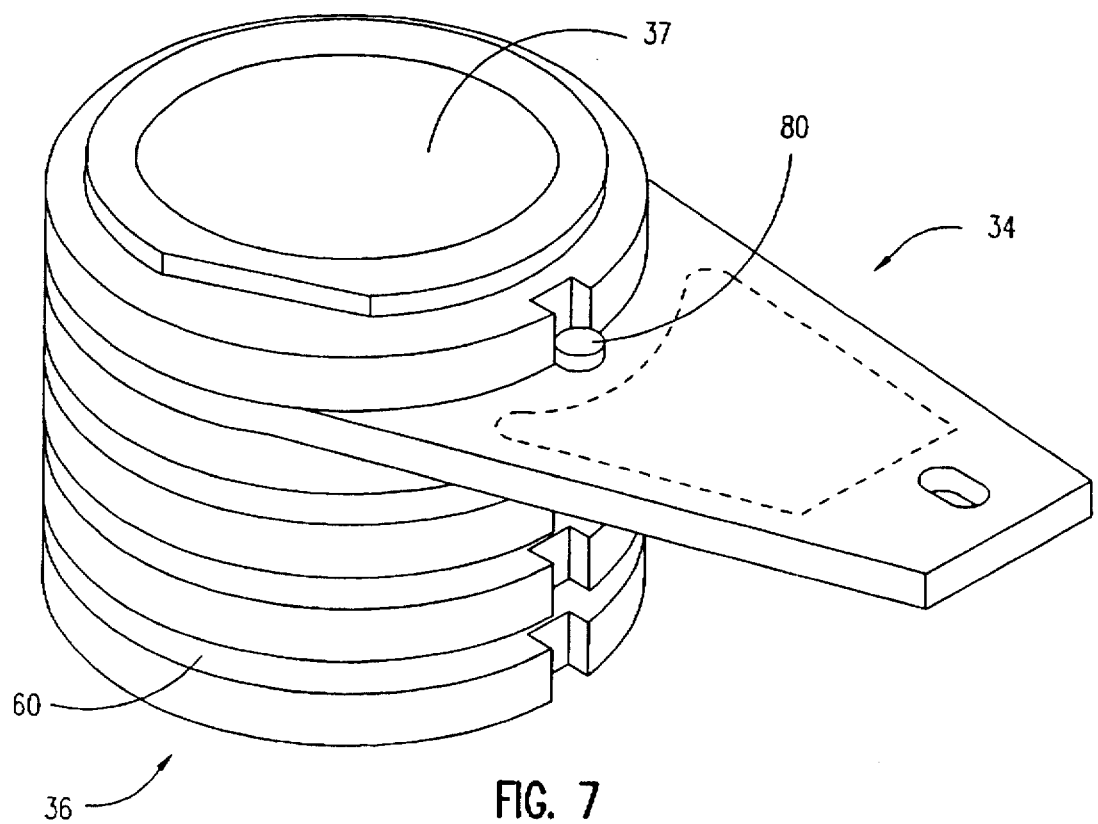
FIG. 7 is a perspective view of the actuator member of FIG. 2 and the self-locking arm of FIG. 3 in the locked position.
Figure 8:
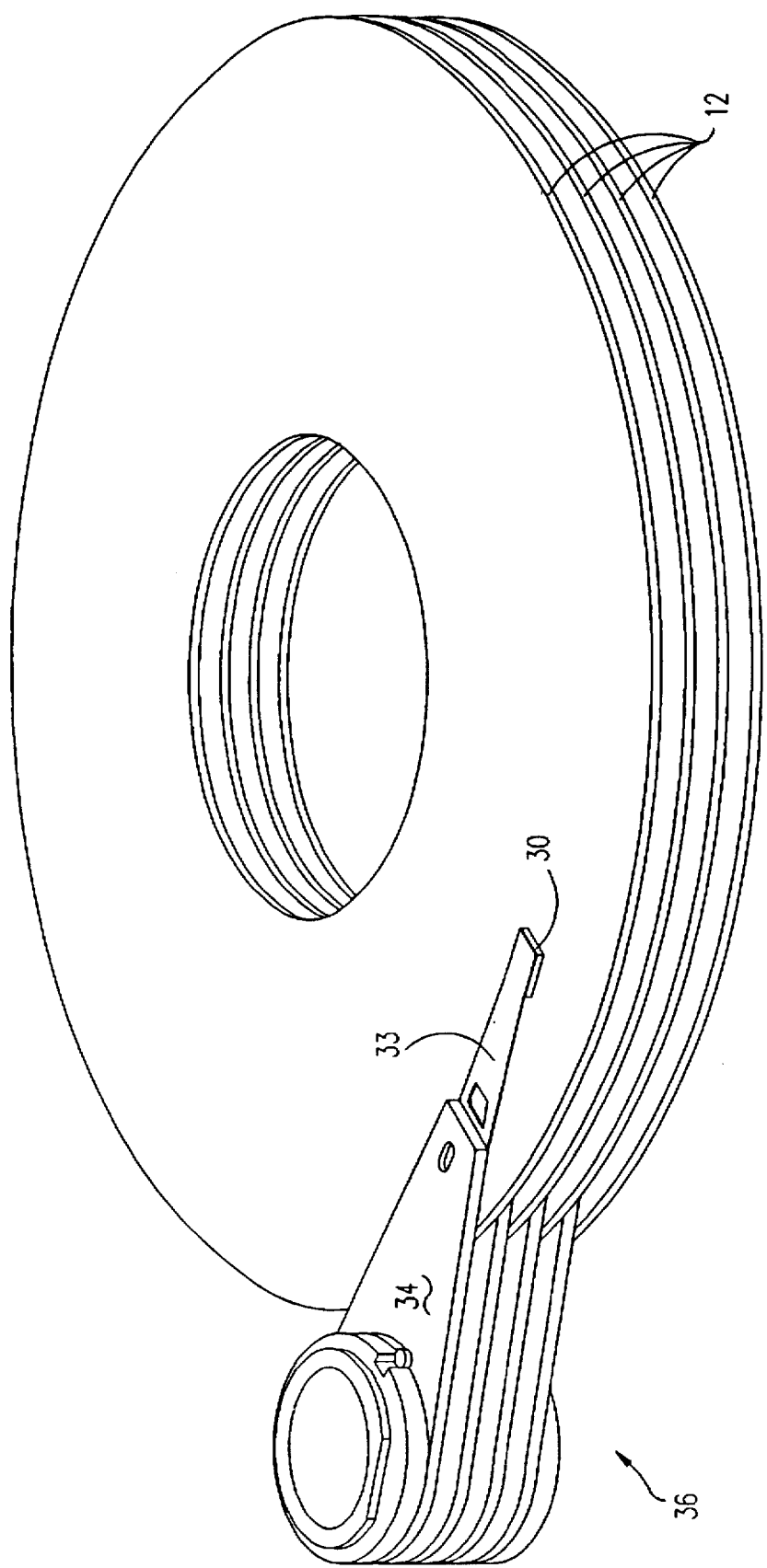
FIG. 8 is a perspective view of the actuator member of FIG. 2 and the self locking arm of FIG. 3 attached to head suspension assemblies and a plurality of disks.

FIG. 7 shows a perspective view of the self-locking arm 34 locked into one of the horizontal grooves 60 of the actuator member 36. Boss 80 prevents lateral motion of the arm 34, the plurality of dimples 78 on the top side 72 of the arm 34 resist vertical motion, and the first and second ends 77 of the arm 34 which are in contact with the circular wall 67 prevent longitudinal motion. FIG. 8 is a perspective view of the present invention showing the actuator member 36 having a plurality of horizontal grooves with four self-locking arms 34 locked into actuator member 36 and a plurality of head suspension assemblies 33 attached to the self-locking arms 34 interacting with a plurality of disks 12.

Figure 9:
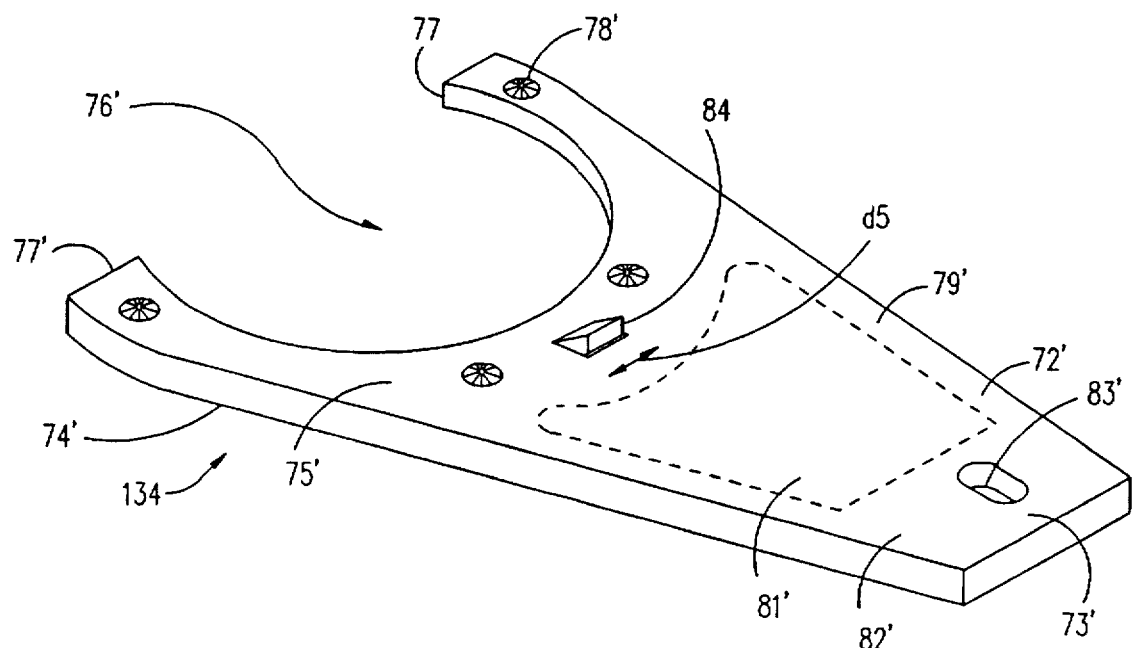
FIG. 9 is a perspective view of an alternative embodiment of a self-locking arm showing a tab on the top surface of the arm.

FIG. 9 shows an alternative self-locking arm 134, to be used in the disk drive system 10, similar to the self-locking arm 34 shown in FIG. 3. Parts on the arm 134 which correspond to the parts on the arm 34 are designated by prime numbers. The alternative self-locking arm 134 provides a tab 84, also known as an alignment means, at the top side 72'. The tab 84, having a width d5, is located substantially near to and at a predetermined distance from the C-shaped opening 76'. In order to lock the arm 134 into the actuator member 36, the C-shaped opening 76' is inserted into a horizontal groove 60 along the tangential cut 68 and then the arm is rotated clockwise until the tab 84 is aligned with the vertical groove 69 which at that point the arm 134 is pushed, along its longitudinal axis, toward the actuator member 36 until the tab 84 is firmly engaged inside the vertical groove 69. The arm 134 is removed by pulling the arm 134, along its longitudinal axis, away from the actuator member 36 until tab 84 is disengaged from vertical groove 69 and then the arm is turned counterclockwise and removed. In the preferred embodiment, the width of the tab 84, d5, is larger than the width d2 of the vertical groove 69 by a predetermined amount to provide interference sufficient to prevent lateral motion of the arm 134 in the locked position. Also, the distance d3 between the first and second ends 77' of the C-shaped opening 76' is selected to be smaller than the diameter d1 of the circular wall 67 by a predetermined amount. Therefore, when the arm 134 is locked inside the horizontal groove 60, the first and second ends 77' of the C-shaped opening 76' are pushed outwardly by the circular wall 67 thereby creating a substantial retention force in the longitudinal direction.

Figure 10:
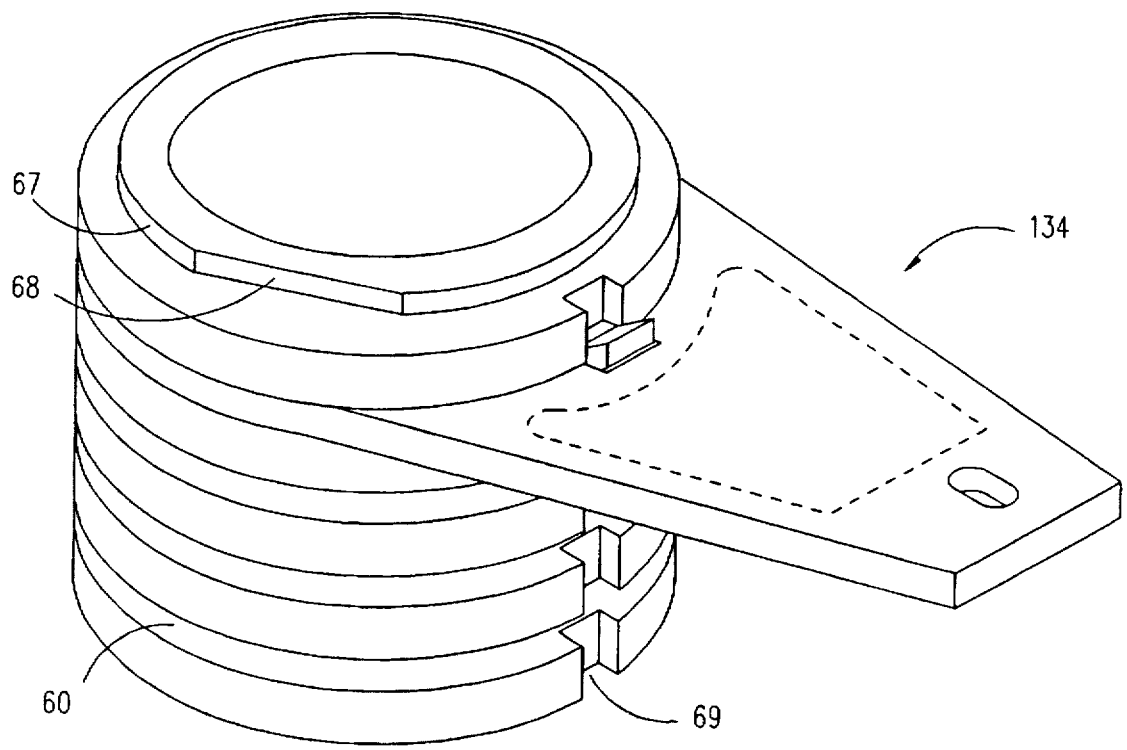
FIG. 10 is a perspective view of the self locking arm of FIG. 9 and the actuator member of FIG. 2 in the locked position.

FIG. 10 shows a perspective view of the actuator member 36 and the self-locking arm 134 in the locked position. Tab 84 prevents lateral motion of the arm 134 in the locked position, the plurality of dimples 78' on the top side 72' of the arm 134 resist vertical motion, and the first and second ends 77' of the arm 134 which are in contact with the circular wall 67 prevent longitudinal motion.

Figure 11:
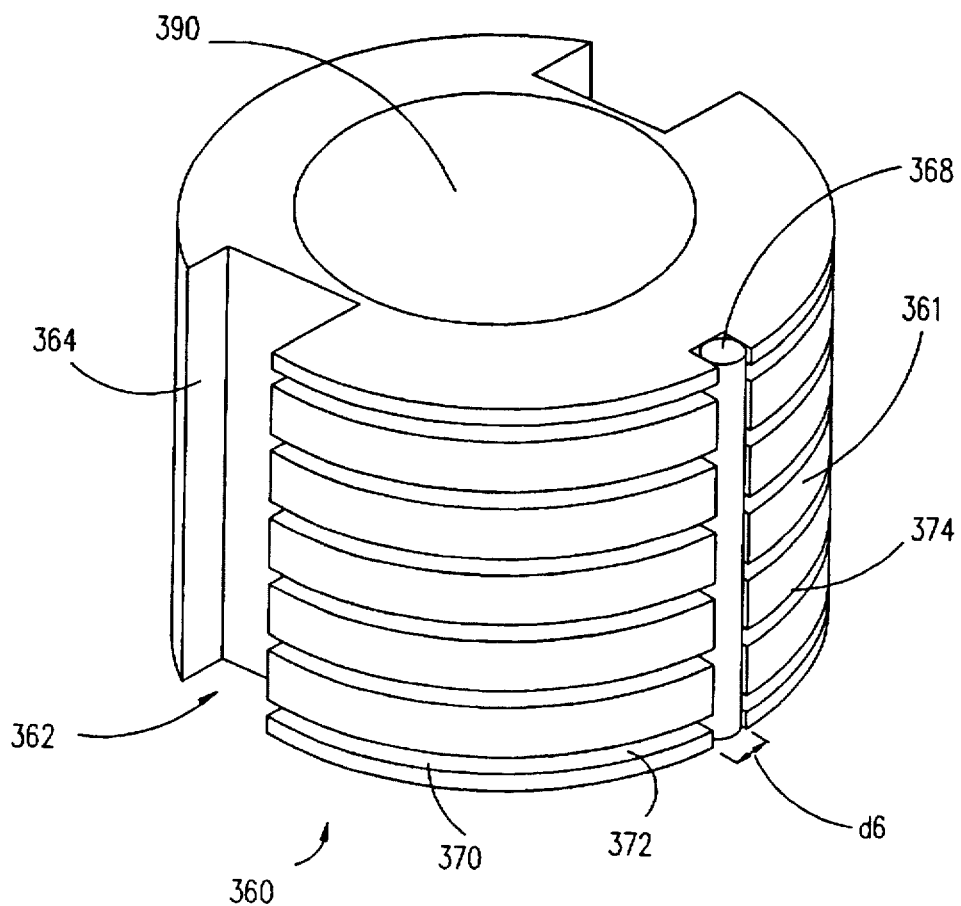
FIG. 11 is a perspective view of an alternative actuator member.
Figure 12:
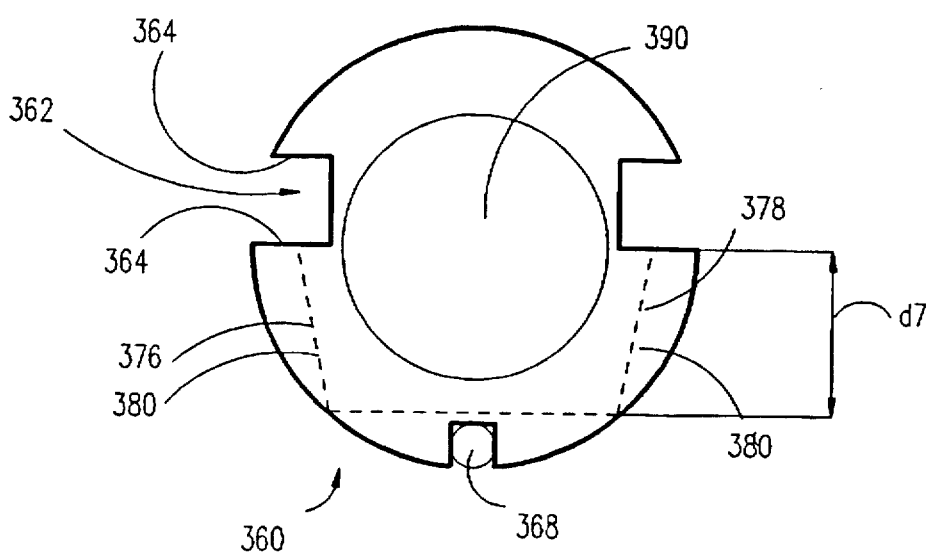
FIG. 12 is a top view of the actuator member shown in FIG. 11.

FIGS. 11 and 12 show a perspective and top view of an alternative actuator member 360 to be used in the disk drive system 10, similar to the actuator member 36. The actuator member 360 is generally used in conjunction with the self-locking arm 234 shown in FIGS. 13, 14, 15, 16, 17, and 18. Now referring mainly to FIGS. 11 and 12, the actuator member 360 comprises a plurality of vertical grooves 362. Each vertical groove 362 has a pair of sidewalls 364 substantially facing each other. In the preferred embodiment, the vertical grooves 362 extend the height of the actuator member 360. Actuator member 360 further comprises a pin 368 which is inserted into one of the vertical grooves 362. The pin 368 has a predetermined width d6 to ensure that substantial interference with side walls 364 are created after insertion. In the preferred embodiment, the pin 368 extends the height of the actuator member 360. The actuator member 360 further comprises a plurality of horizontal grooves 370 having a predetermined height. In the preferred embodiment, the horizontal grooves 370 are formed within the circumference 361 of the actuator member 360. Each horizontal groove 370 comprises a bottom surface 372, a top surface 374, and a vertical surface 376. The vertical surface 376 (shown by dashed line in FIG. 12) forms a substantially trapezoidal-shaped wall 378 having three sides where two of the sides 380 substantially face each other. The sides 380 have a vertical dimension d7. Actuator member 360 further includes a longitudinal bore 390.

Figure 13:
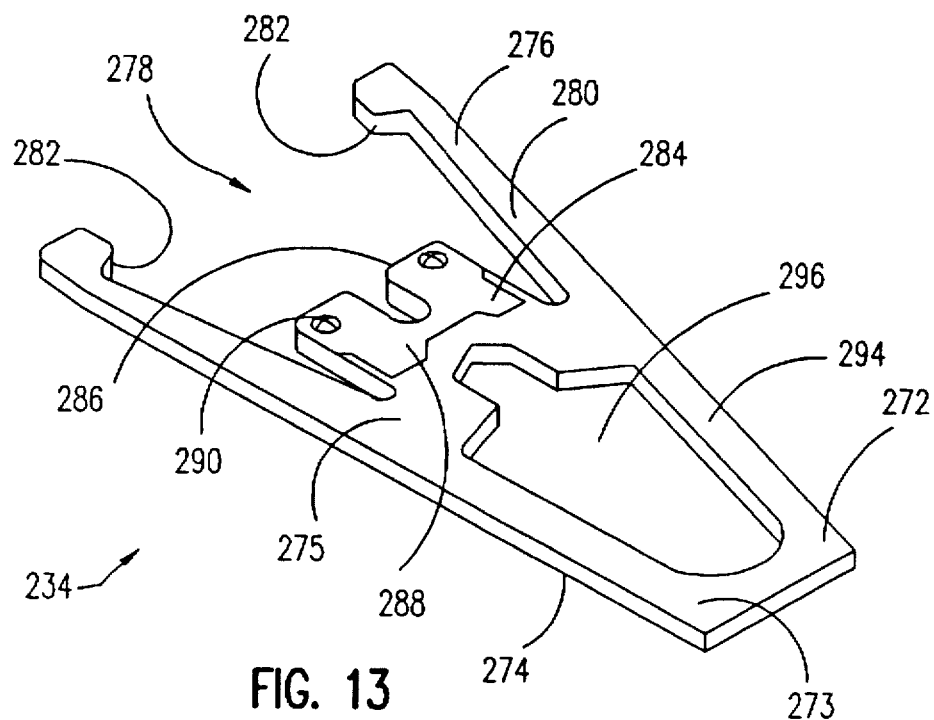
FIG. 13 is a perspective view of an alternative self-locking arm to be used in conjunction with the actuator member of FIG. 11.
Figure 14:
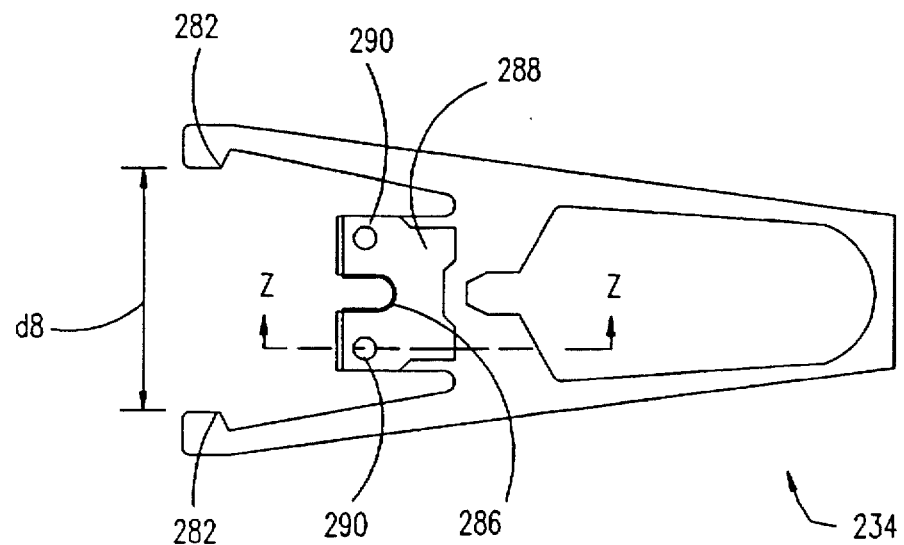
FIG. 14 is a top view of the self-locking arm shown in FIG. 13.
Figure 15:
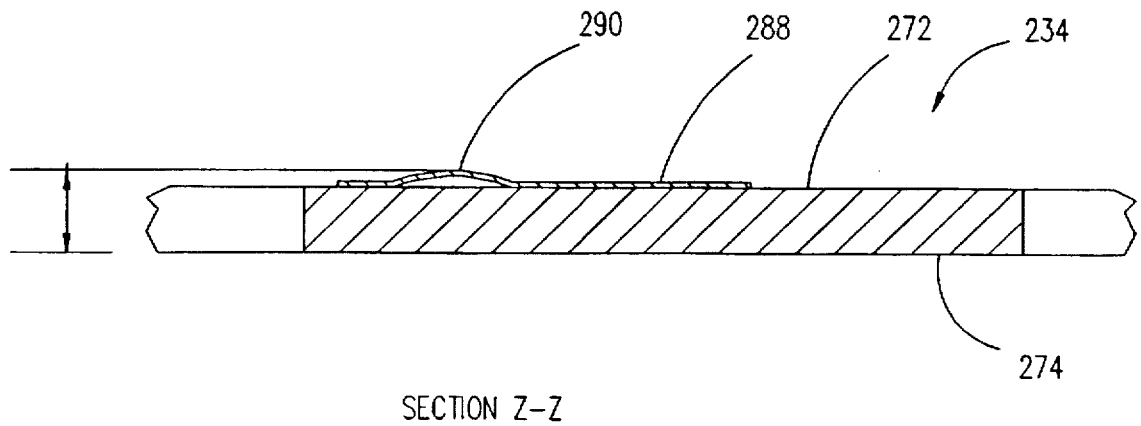
FIG. 15 is a side view of cross-section Z—Z of the arm shown in FIG. 14.

FIGS. 13, 14, and 15 show a perspective view, a top view, and portion of a side view, respectively, of an alternative self-locking arm 234 to be used in the disk drive system 10. Now referring mainly to FIGS. 13, 14, and 15, the arm 234 comprises a top side 272, a bottom side 274, a front end portion 273, and a rear end portion 275. Extending from the rear end portion 275 is a pair of extension arms 276. The rear end portion 275 incorporates a trapezoidal-shaped opening 278 where the extension arms 276 form the opposite sides 280 of the trapezoidal-shaped opening 278. Each extension arm 276 has a tip 282 which extends inwardly. The distance between the tips 282 from each other is shown as dimension d8. A protrusion 284 is formed at the rear end portion 275 within the trapezoidal-shaped opening 278 and is extended outwardly. The protrusion 284 is substantially rectangular in shape. At least one notch 286, also known as an alignment means, is incorporated in the protrusion 284. A strip 288 of preferably stainless steel material is attached to the top portion 272 of the arm 234 substantially covering the protrusion 284. The strip 288 is attached to the arm 234 by utilizing a method such as bonding or welding. A plurality of dimples 290 is formed on the strip 288. The dimples 290 are compressed by the top surface 374 (see FIG. 11) of the actuator member 360 when the arm 234 is in the locked position inside the actuator member 360 thereby providing the vertical retaining force necessary to resist vertical motion of the arm 234. Extending from the rear end portion 275 toward the front end portion 273 is a trapezoidal-shaped portion 294 incorporating a large aperture 296. A pair of skin sheets (not shown) may be attached to the top side 272 and the bottom side 274 to provide an additional high torsional and in-plane bending stiffness for the arm 234. The skin sheets may be the flexure components of a head suspension assembly.

Figure 16:
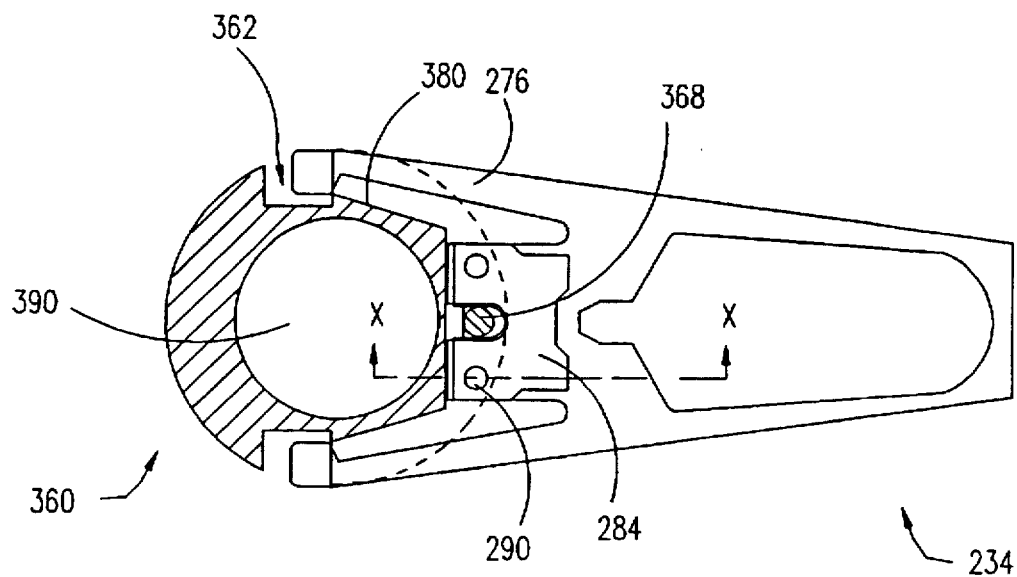
FIG. 16 is a top view of the self-locking arm of FIG. 13 and the actuator member of FIG. 11 in the locked position.
Figure 17:
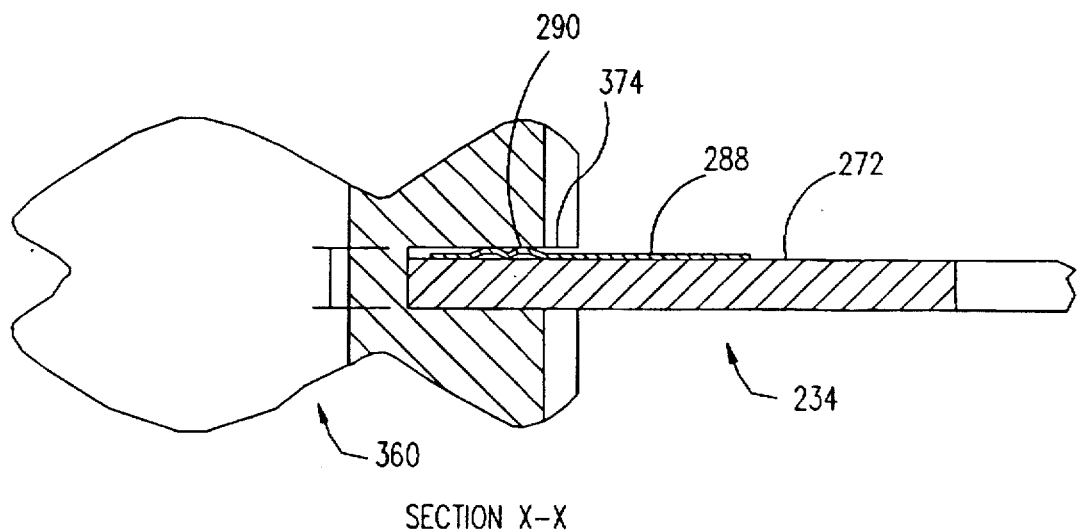
FIG. 17 is a side view of cross-section X—X of the arm and the actuator member of FIG. 16.
Figure 18:
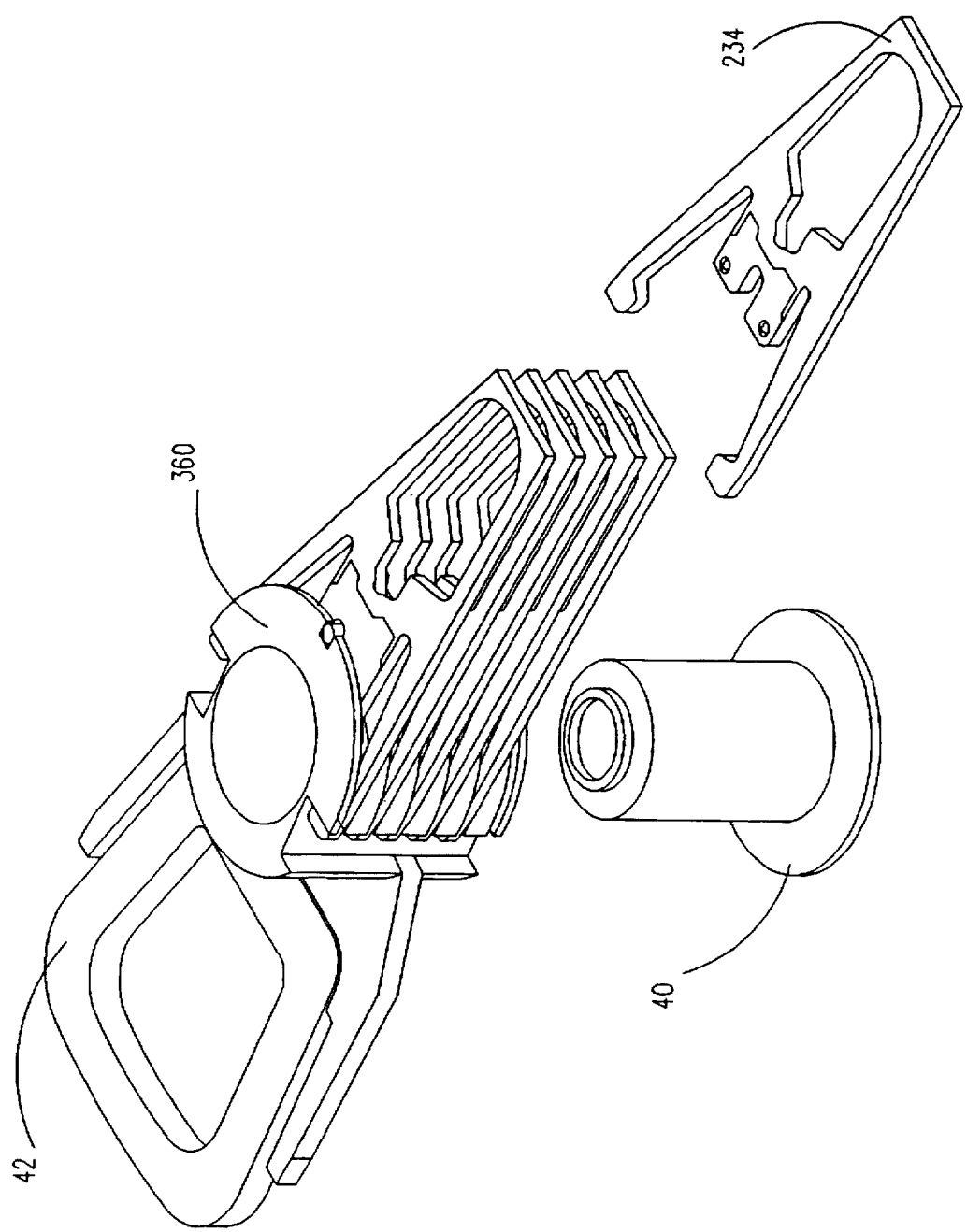
FIG. 18 is a perspective view of a plurality of self-locking arms of FIG. 13 and the actuator member of FIG. 11 in the locked position.

FIGS. 16 and 17 show a top view and portion of a side view, respectively, of the self-locking arm 234 and the actuator member 360 in the locked position. FIG. 18 shows a perspective view of a plurality of the self-locking arms 234 and the actuator member 360 in the locked position. Now referring mainly to FIGS. 16, 17, and 18, in order to lock the arm 234 into the actuator member 360, the extension arms 276 are inserted into a horizontal groove 370, the arm 234 is then pushed along its longitudinal axis while the tips 282 of the extension arms 276 are forced apart by the sides 380 of the trapezoidal-shaped wall 378 until the tips 282 of the extension arms 276 come in contact and rest against the side walls 364 of the vertical grooves 362, the notch 286 engages in substantial interference with pin 368, and the dimples 290 engage in substantial interference with the top surface 374 of the horizontal groove 370. Once the arm 234 is in the locked position, the lateral retaining force is provided by the notch 286 which has a width sufficiently smaller than the width of the pin 368 to ensure substantial interference once they are engaged. The vertical retaining force is provided by the dimples 290. The total thickness of the arm 234 and the dimples 290 are sufficiently larger than the height of the horizontal grooves 370 to ensure that substantial interference is created once the arm 234 is in the locked position. The longitudinal retaining force is provided by the tips 282 of the extension arms 276, and the extension arms 276 which are pushed outwardly by the two sides 380 of the trapezoidal-shaped wall 378. The arm 234 is unlocked and removed by disengaging the tips 282 from the side walls 364 of the vertical groove 362 and then pulling the arm away from the actuator member 360 along its longitudinal axis.

Figure 19:
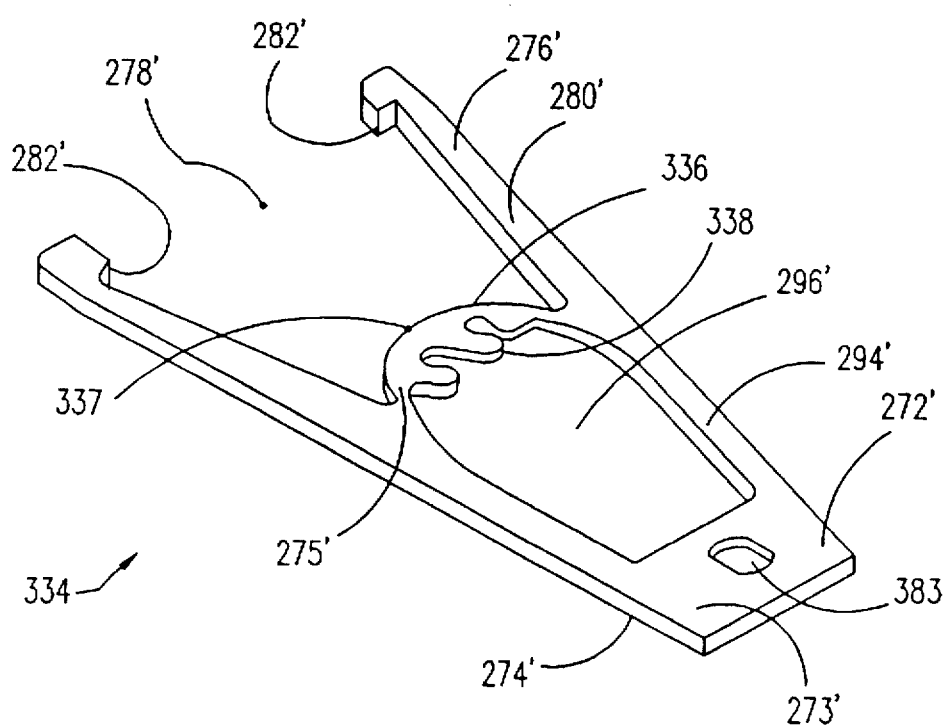
FIG. 19 is a perspective view of another alternative self-locking arm.
Figure 20:
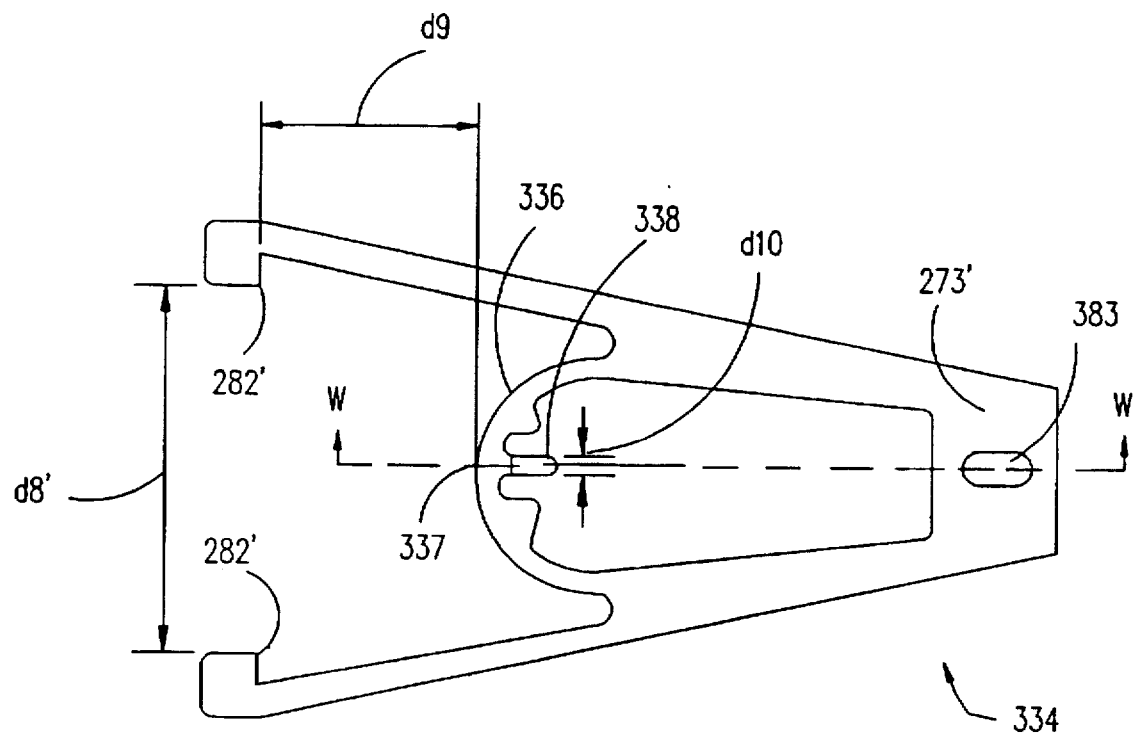
FIG. 20 is a top view of the self-locking arm shown in FIG. 19.
Figure 21:
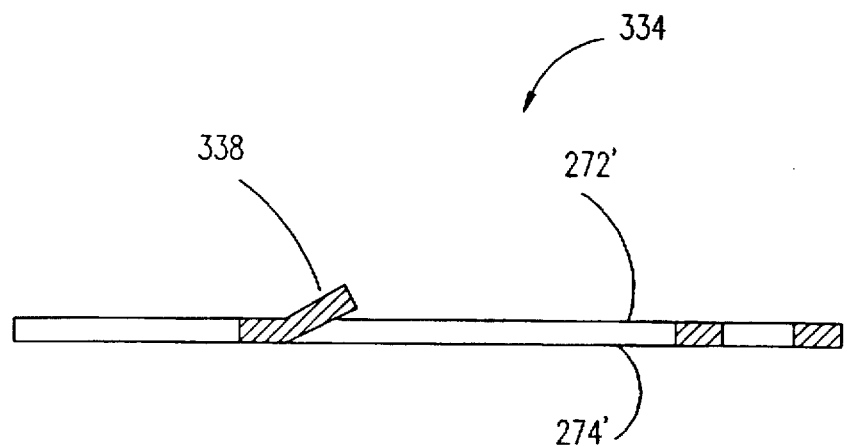
FIG. 21 is a side view of cross-section W—W of the self-locking arm shown in FIG. 20.

FIGS. 19, 20, and 21 show a perspective view, a top view, and a side view, respectively, of an alternative self-locking arm 334, to be used in the disk drive system 10, similar to the self-locking arm 234. Parts on the arm 334 which correspond to the parts on the arm 234 are designated by the prime numbers. Now, referring to FIGS. 19, 20, and 21, an arc-shaped protrusion 336 is formed at the rear end portion 275' within the trapezoidal-shaped opening 278' and is extended outwardly. The distance between the tip 282' and the highest point 337 of the arc-shaped protrusion 336 is d9. A tab 338, also known as an alignment means, is formed on the top side 272' between the arc-shaped protrusion 336 and the aperture 296'. The tab 338 has a width d10 and extends toward the front end portion 273' and forms a predetermined angle with the top side 272'. An alignment hole 383 is further incorporated in the front end portion 273' to ensure precise alignment of the arm 334 and the head suspension assembly 33 during the attachment process. A pair of skin sheets (not shown) may be attached to the top side 272' and the bottom side 274' to provide additional high torsional and in-plane bending stiffness for the arm 334. The skin sheets may be the flexure components of a head suspension assembly.

Figure 22:
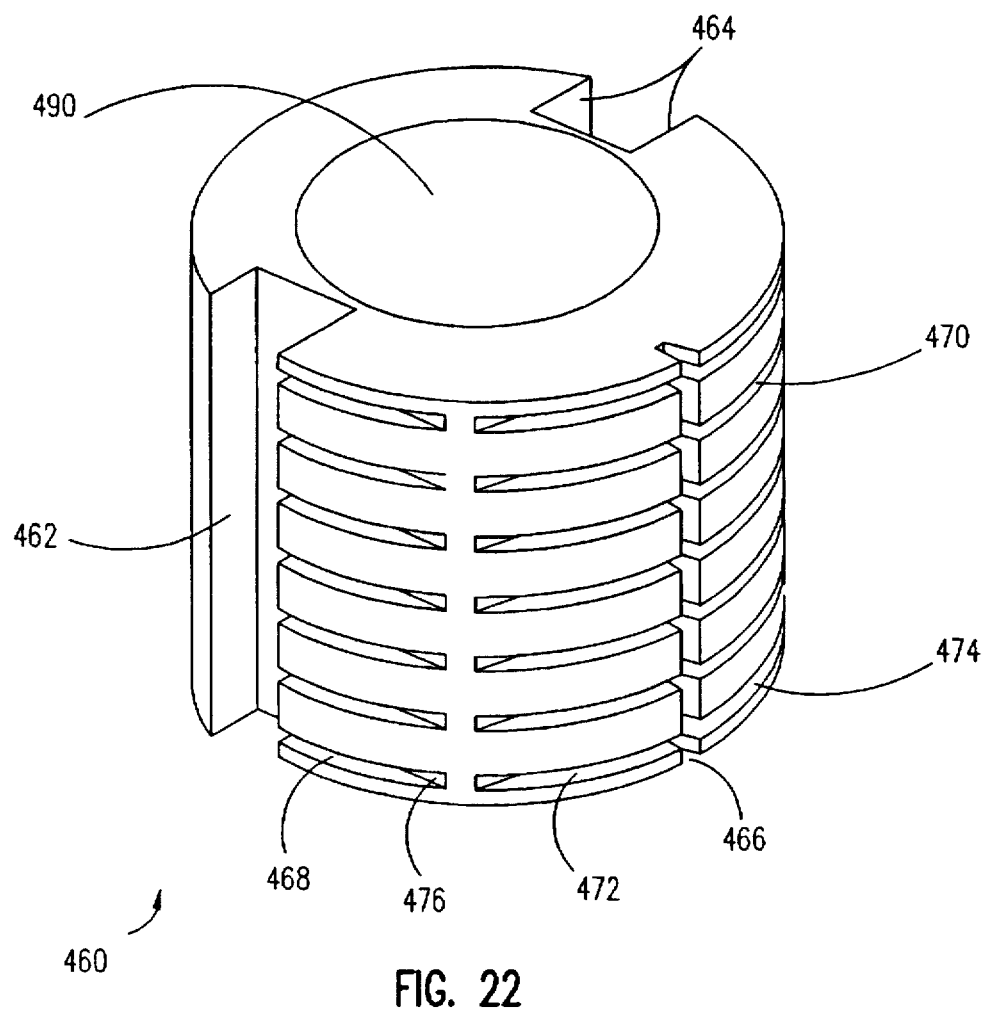
FIG. 22 is a perspective view of an alternative actuator member to be used with the self-locking arm of FIG. 19.
Figure 23:
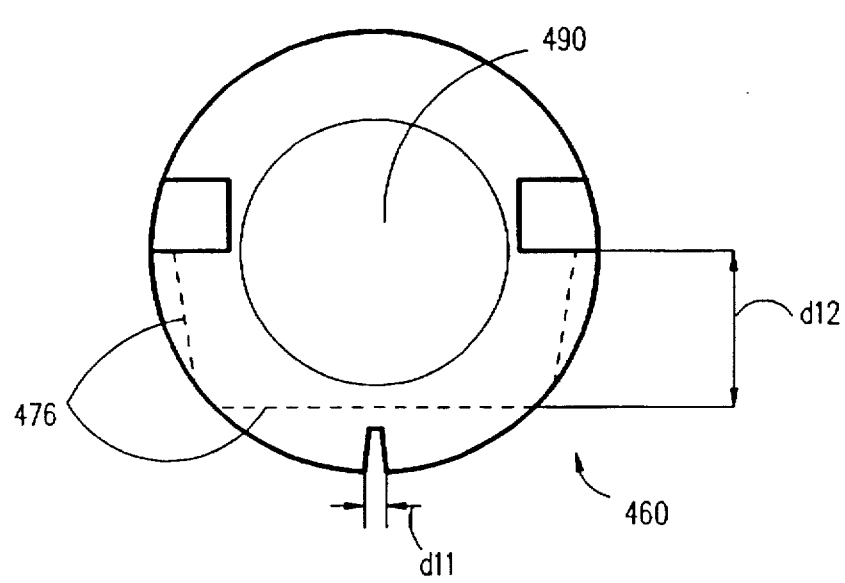
FIG. 23 is a top view of the actuator member shown in FIG. 22.

FIGS. 22 and 23 show a perspective view and a top view of an alternative actuator member 460 to be used with the self-locking arm 334 in the disk drive system 10. The actuator member 460 comprises a plurality of vertical grooves 462 having a pair of side walls 464 which substantially face each other, a V-shaped groove 466 having a width d11, and a plurality of discrete horizontal grooves 468 having a predetermined height. The width d11 of the V-shaped groove 466 is smaller than the width d10 of the arm 334 by a predetermined amount. Discrete horizontal grooves 468 which are in a single plane form a horizontal groove pattern 470. Each discrete horizontal groove 468 has a bottom surface 472, a top surface 474, and a vertical surface 476. The vertical surface 476 has a vertical dimension d12 which is smaller than the dimension d9 (see FIG. 20) of the arm 334 by a predetermined amount. In the preferred embodiment, the horizontal groove patterns 470 are formed within the circumference of the actuator member 460. Actuator member 460 further includes a longitudinal bore 490.

Figure 24:
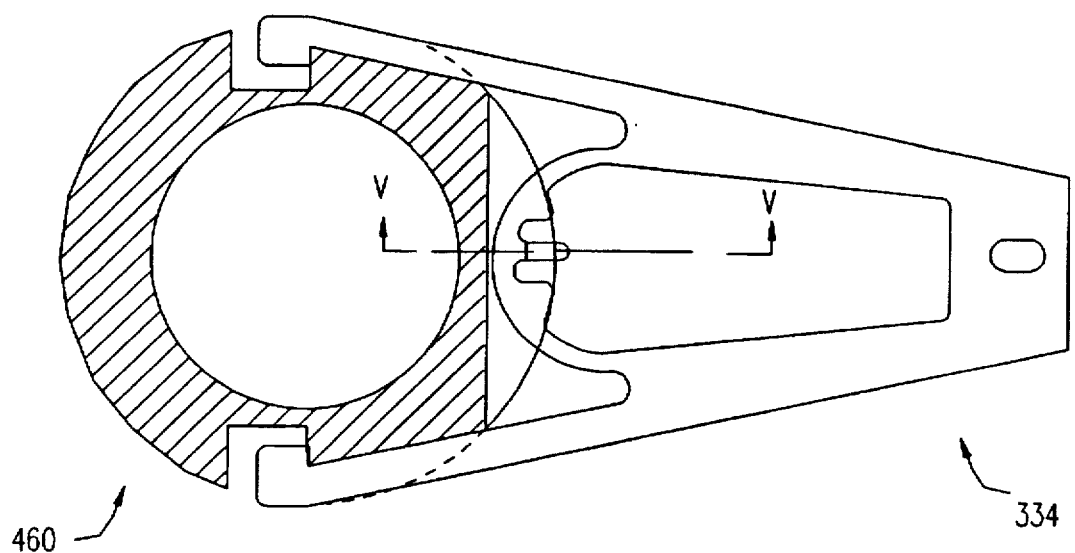
FIG. 24 is a top view of the self-locking arm of FIG. 19 and the actuator member of FIG. 22 in the locked position.
Figure 25:
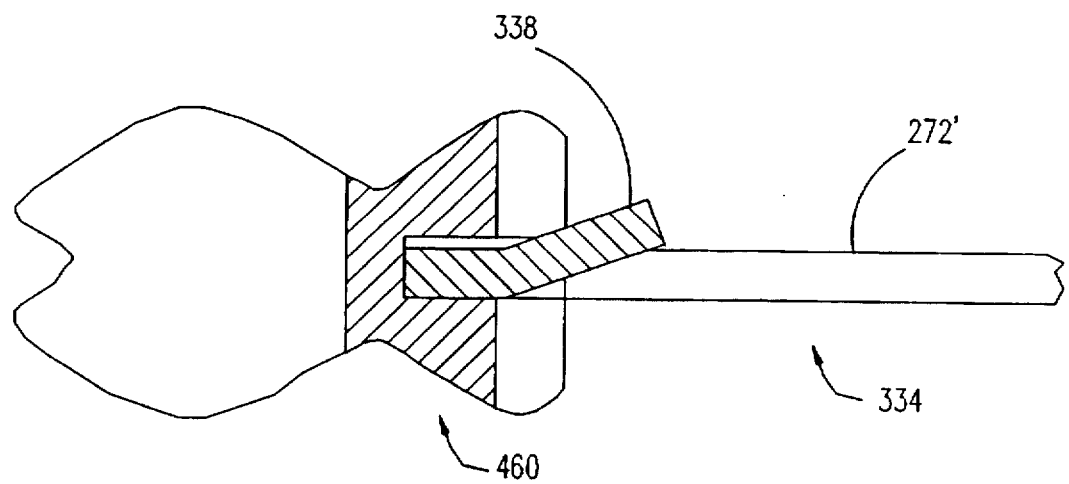
FIG. 25 is a side view of cross-section V—V of the actuator member and the self-locking arm shown in FIG. 24.
Figure 26:
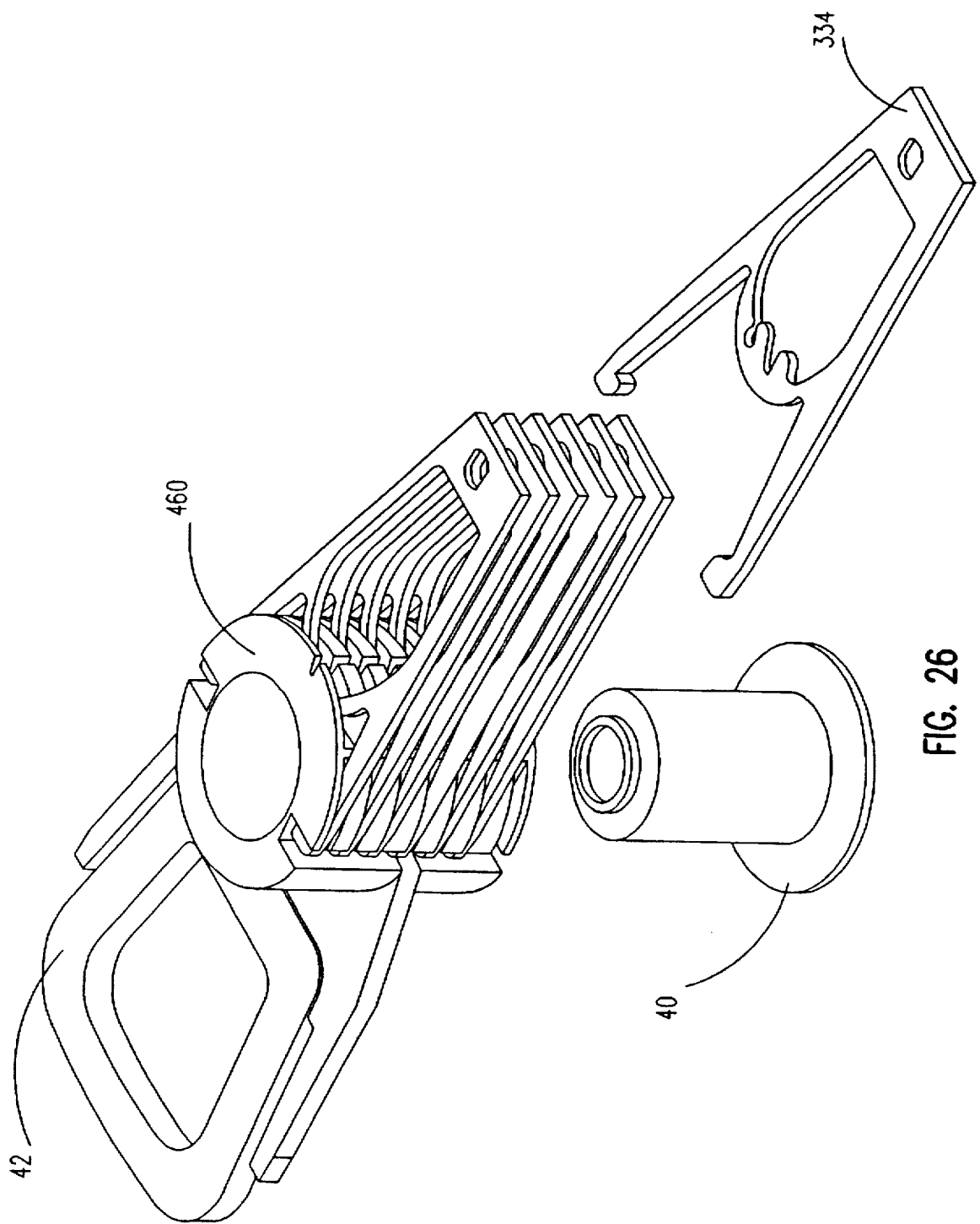
FIG. 26 is a perspective view of a plurality of the self-locking arms of FIG. 19 and the actuator member of FIG. 22 in the locked position.

FIGS. 24 and 25 show a top view and portion of a side view, respectively, of the actuator member 460 and the self-locking arm 334 in the locked position. FIG. 26 shows a perspective view of a plurality of the arms 334 and the actuator member 460 in the locked position. Now referring mainly to FIGS. 24, 25, and 26, the arm 334 is locked into the actuator member 460 and unlocked in a similar manner that the self-locking arm 234 is locked into the actuator member 360 and unlocked. The tab 338 is designed to mate with the V-shaped groove 466. Furthermore, as the arm 334 is inserted into a horizontal groove pattern 470 the tab 338 is engaged with the top surface 474 of a discrete horizontal groove 468 which causes the tab 338 to be pushed downwardly by a predetermined amount thereby providing a sufficient retaining force in both the lateral and the vertical direction. The longitudinal retaining force is provided by both the tips 282' of the extension arms 276', the extension arms 276' which are pushed outwardly by the vertical surface 476 of discrete horizontal grooves 468, and the arc-shaped protrusion 336 which is pushed away by the vertical surface 476 of a discrete horizontal groove 468 when the arm is in the locked position.

Figure 27:
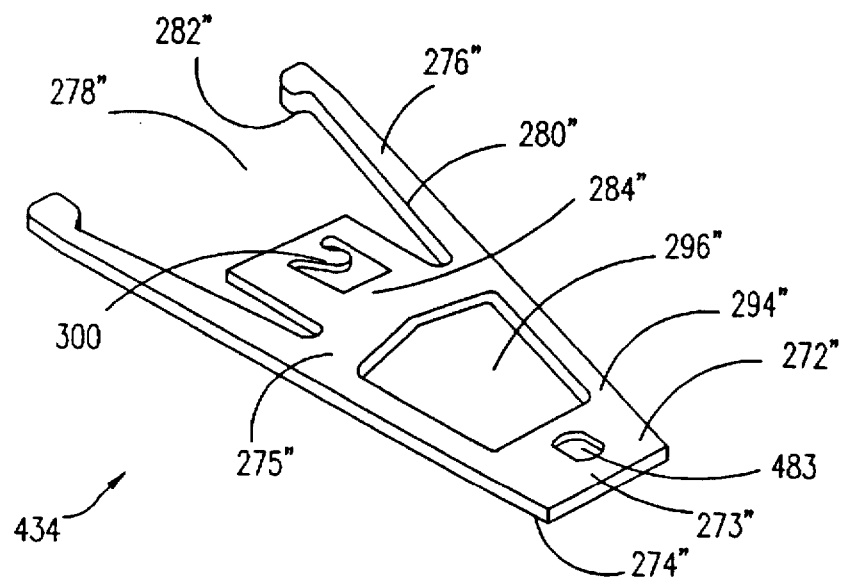
FIG. 27 is a perspective view of another self-locking arm to be used with the actuator member of FIG. 22.
Figure 28:
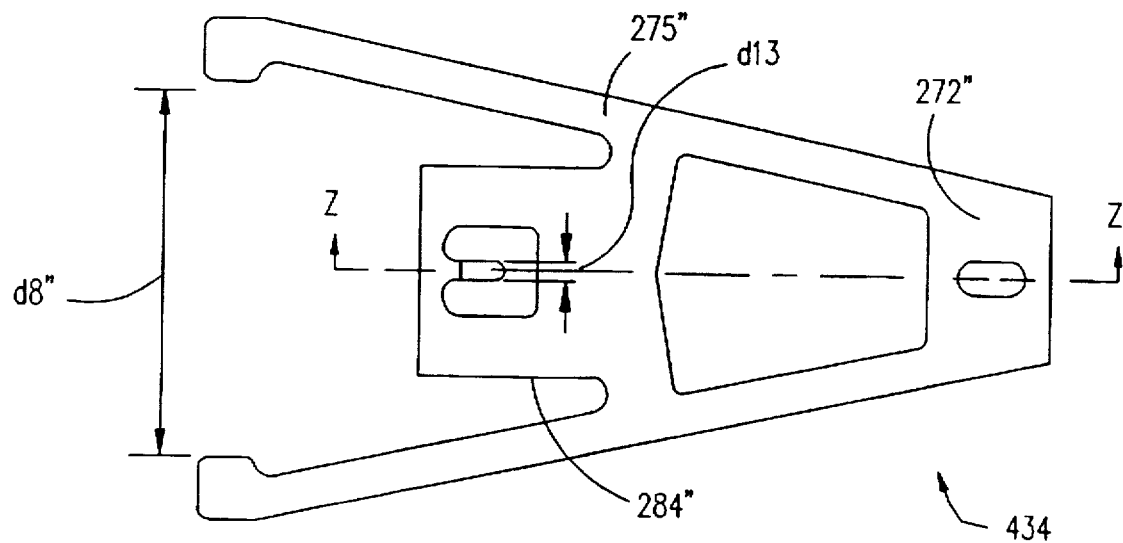
FIG. 28 is a top view of the self-locking arm shown in FIG. 27.

FIGS. 27 and 28 show a perspective view and a top view, respectively, of an alternative self-locking arm 434, to be used in the disk drive system 10, similar to the self-locking arm 234. Parts on the arm 434 which correspond to the parts on the arm 234 are designated by double prime numbers. A protrusion 284" is formed at the rear end portion 275" within the trapezoidal-shaped opening 278" and is extended outwardly. The protrusion 284" is substantially rectangular in shape. A tab 300 is formed on the top side 272" of the arm 434 over the protrusion 284". The tab 300 is formed at a predetermined angle with respect to the longitudinal axis of the arm 434 and has a width d13. The width d13 is larger than the width d11 of the actuator member 460 (see FIG. 22) by a predetermined amount. An alignment hole 483 is incorporated in the front end portion 273" to ensure precise alignment between the arm 434 and the head suspension assembly 33 during the attachment process.

Figure 29:
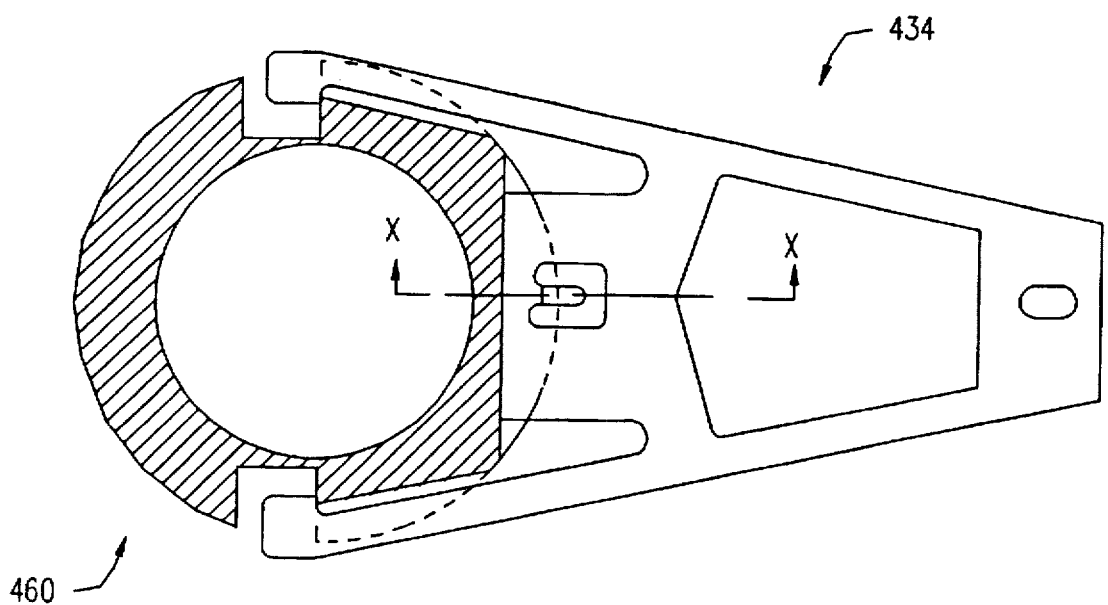
FIG. 29 is a top view of the self-locking arm of FIG. 27 and the actuator member of FIG. 22 in the locked position.
Figure 30:
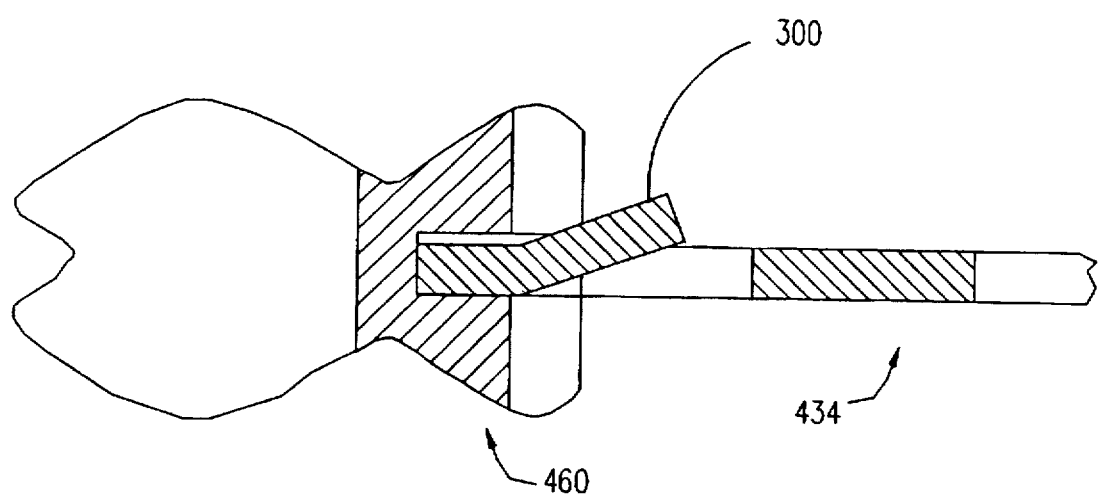
FIG. 30 is a side view of cross-section X—X of the actuator member and the self-locking arm shown in FIG. 29.

FIGS. 29 and 30 show a top view and portion of a side view, respectively, of the self-locking arm 434 and the actuator member 460 in the locked position. The principle of locking and unlocking the arm 434 is similar to the arm 234.

Figure 31:
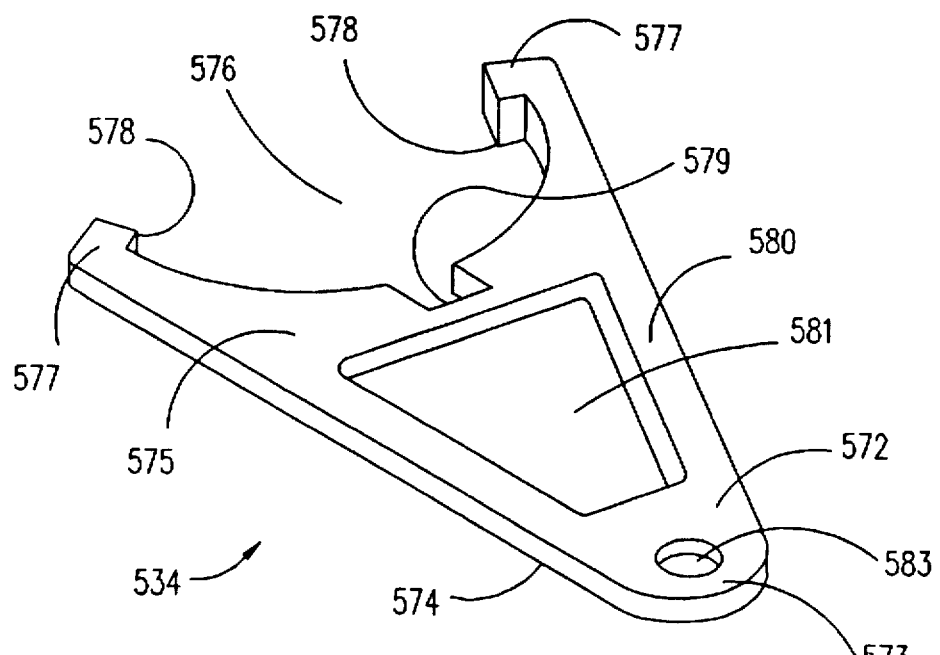
FIG. 31 is a perspective view of yet another self-locking arm.
Figure 32:
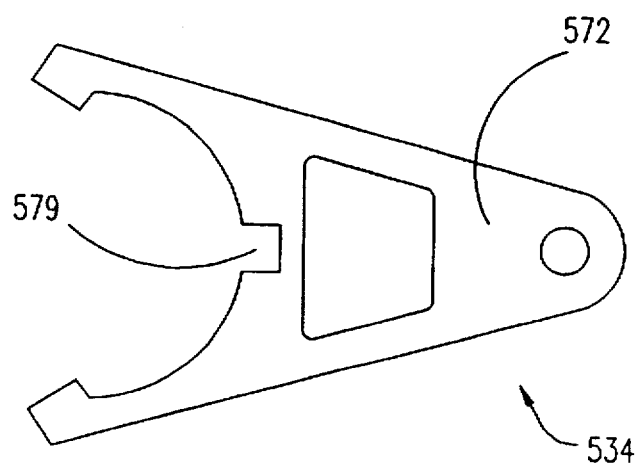
FIG. 32 is a top view of the self-locking arm shown in FIG. 31.
Figure 33:
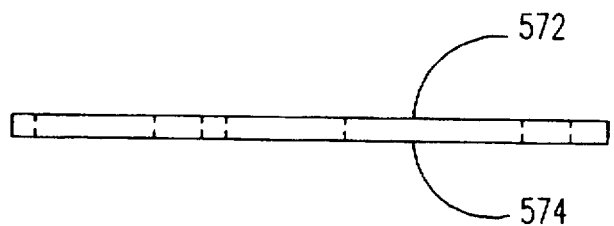
FIG. 33 is a side view of the self-locking arm shown in FIG. 31.

FIGS. 31, 32, and 33 show a perspective, a top view, and a side view, respectively, of an alternative self-locking arm 534 to be used in the disk drive system 10. Now referring mainly to FIGS. 31, 32, and 33, the arm 534 comprises a top side 572, a front end portion 573, a bottom side 574, and a rear end portion 575. The rear end portion 575 incorporates a C-shaped opening 576 where the opening 576 has first and second ends 577. The first and second ends 577 each have a tip 578 which extends inwardly. A notch 579 is incorporated in the C-shaped opening 576. Extending from the rear end portion 575 toward the front end portion 573 is a trapezoidal-shaped portion 580 incorporating a large aperture 581. An alignment hole 583 is incorporated in the front end portion 573 to ensure precise alignment of the arm 534 and the head suspension assembly 33 (not shown) during the attachment process.

Figure 34:
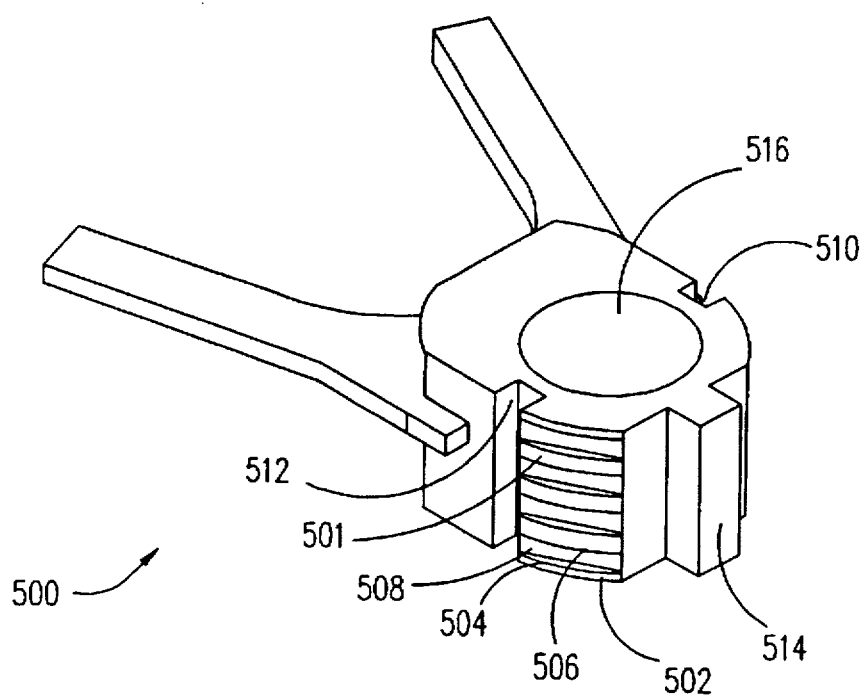
FIG. 34 is a perspective view of an alternative actuator member to be used in conjunction with the self-locking arm of FIG. 31.
Figure 35:
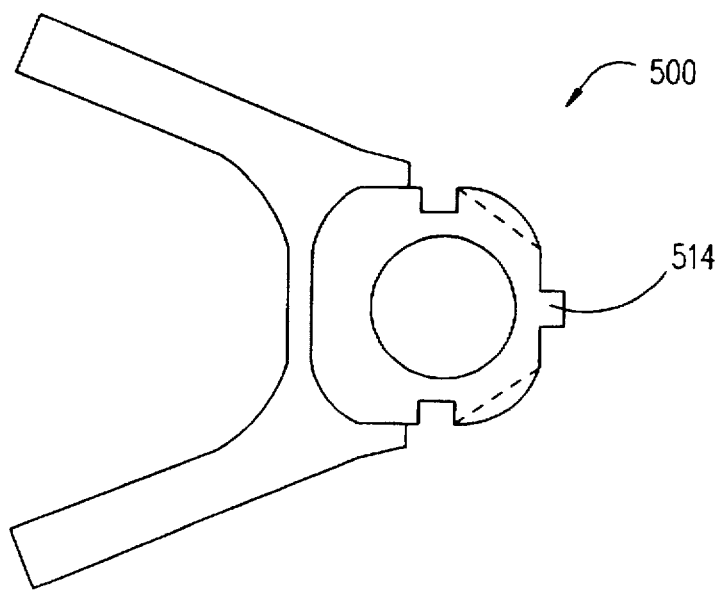
FIG. 35 is a top view of the actuator member shown in FIG. 34.
Figure 36:
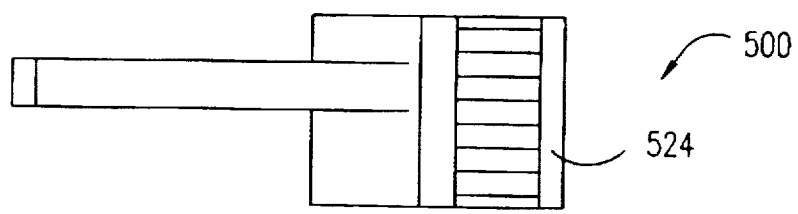
FIG. 36 is a side view of the actuator member shown in FIG. 34.

FIGS. 34, 35, and 36 show a perspective, a top view, and a side view of an alternative actuator member 500 to be used preferably in conjunction with the self-locking arm 534 in the disk drive system 10. The actuator member 500 comprises a plurality of discrete horizontal grooves 502. The horizontal grooves 502 are preferably formed within the circumference 501 of the actuator member 500. In the preferred embodiment, the horizontal grooves 502 have a predetermined height and comprise a bottom surface 504, a top surface 506, and a vertical surface 508. A plurality of vertical grooves 510 having side walls 512 are incorporated within the circumference 501 of the actuator member 500. The actuator member 500 further comprises at least one vertical rib 514. The rib 514 is preferably formed on the circumference 501 of the actuator member 500 between the discrete horizontal grooves 502. The actuator member 500 further includes a bore 516.

Figure 37:
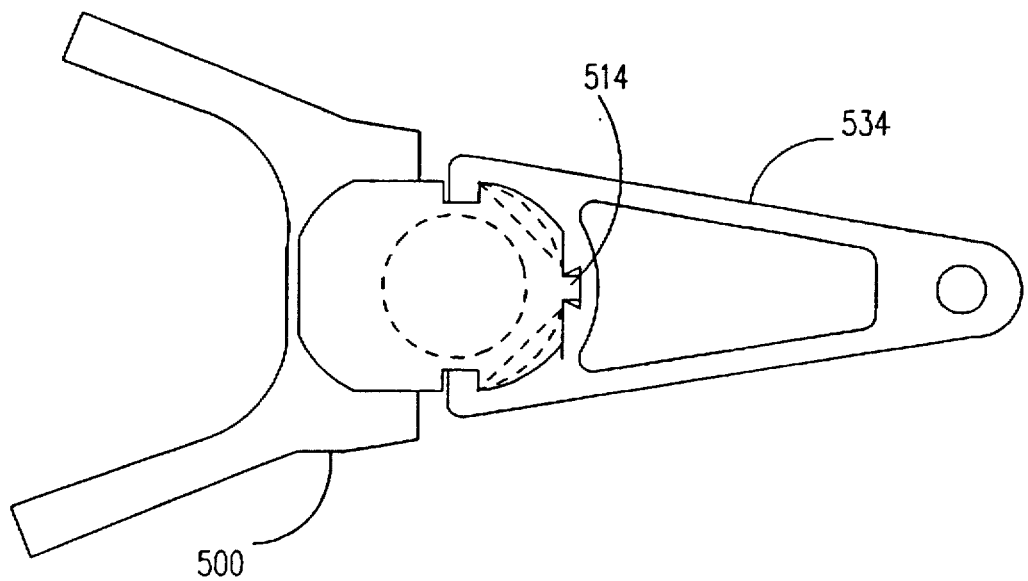
FIG. 37 is the top view of the self-locking arm of FIG. 31 and the actuator member of FIG. 34 in the locked position.

FIG. 37 shows a top view of the actuator member 500 and the self-locking arm 534 in the locked position. The principle of locking and unlocking of the arm 534 is similar to the arm 234. In the locked position the tips 578 of the arm 534 are engaged with the side walls 512 of the vertical grooves 510 and the vertical rib 514 is mated with the notch 579 of the arm 534. The notch 579 and the vertical rib 514 have predetermined widths to ensure substantial interference with each other once they are mated.

Figure 39A:
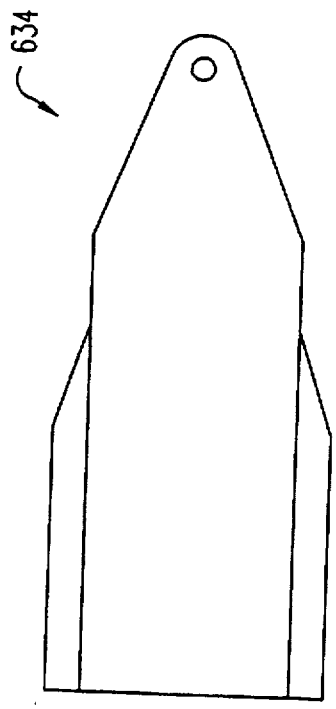
FIG. 39A is a top view of the self-locking arm of FIG. 38.
Figure 39B:
FIG. 39B is a side view of the self-locking arm of FIG. 38.
Figure 38:
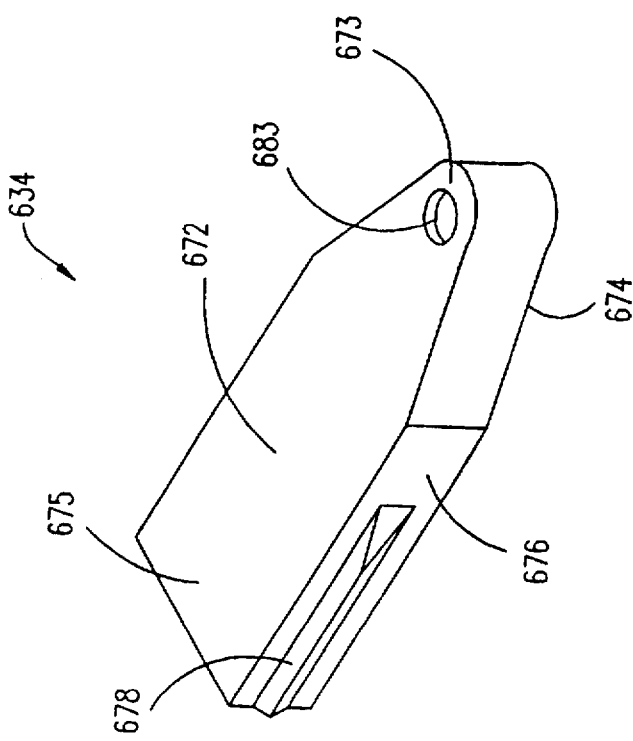
FIG. 38 is a perspective view of another self-locking arm embodiment.
Figure 40:
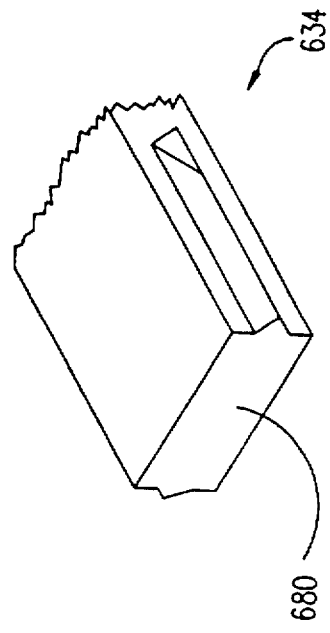
FIG. 40 is a rear end perspective view of the self-locking arm of FIG. 38.

FIGS. 38, 39, and 40 show a perspective, a top view, and portion of a rear end perspective view of an alternative self-locking arm 634 to be used in the disk drive system 10. The arm 634 comprises a top side 672, a front end portion 673, a bottom side 674, a rear end portion 675, side walls 676, and a vertical wall 680. The side walls 676 are substantially parallel to the longitudinal axis of the arm 634. A pair of side wings 678 of a predetermined length are incorporated on the side walls 676. The side wings 678 are preferably V-shaped and are substantially parallel to the longitudinal axis of the arm 634. The vertical wall 680 which is formed at the rear end portion 675 is substantially perpendicular to the longitudinal axis of the arm 634.

Figure 41:
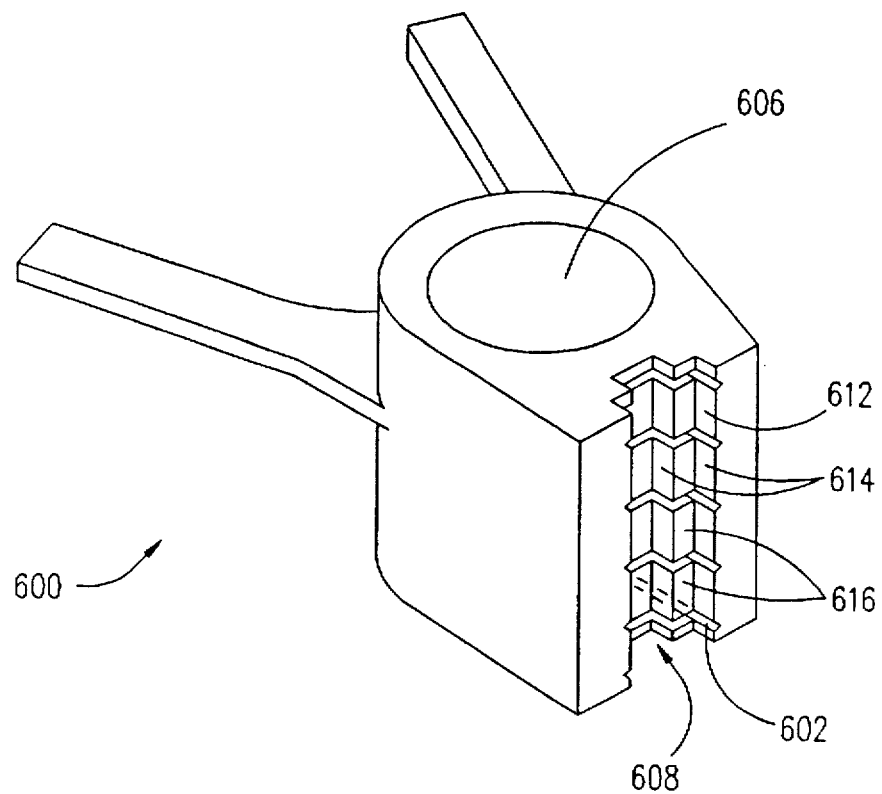
FIG. 41 is a perspective view of another actuator member to be used in conjunction with the self-locking arm of FIG. 38.
Figure 42:
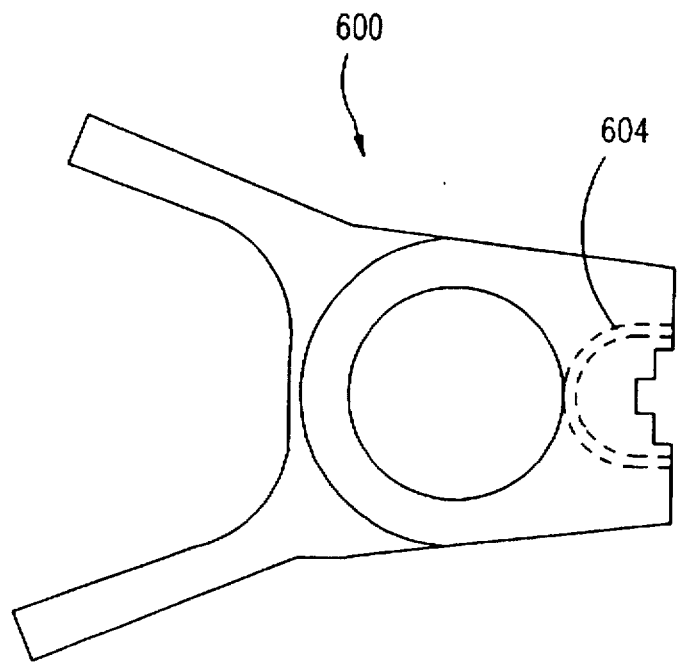
FIG. 42 is a top view of the actuator member of FIG. 41.

FIGS. 41 and 42 show a perspective view and a top view, respectively, of an alternative actuator member 600 to be used, preferably, with the self-locking arm 634 in the disk drive system 10. The actuator member 600 comprises a vertical slot 608 having an inner surface 612. A plurality of V-shaped horizontal grooves 602 are formed within the inner surface 612 of the vertical slot 608. The V-shaped groove 602 has a predetermined dimension to provide sufficient interference with the V-shaped side wings 678 of the arm 634 when the arm 634 and the actuator member 600 are in the locked position. The V-shaped horizontal groove 602 may form a C-shaped indentation 604 (shown by dashed lines in FIG. 42) within the inner surface 612 of the vertical slot 608. The inner surface 612 further incorporates a plurality of side walls 614 and ledge walls 616. The actuator member 600 further includes a bore 606.

Figure 43:
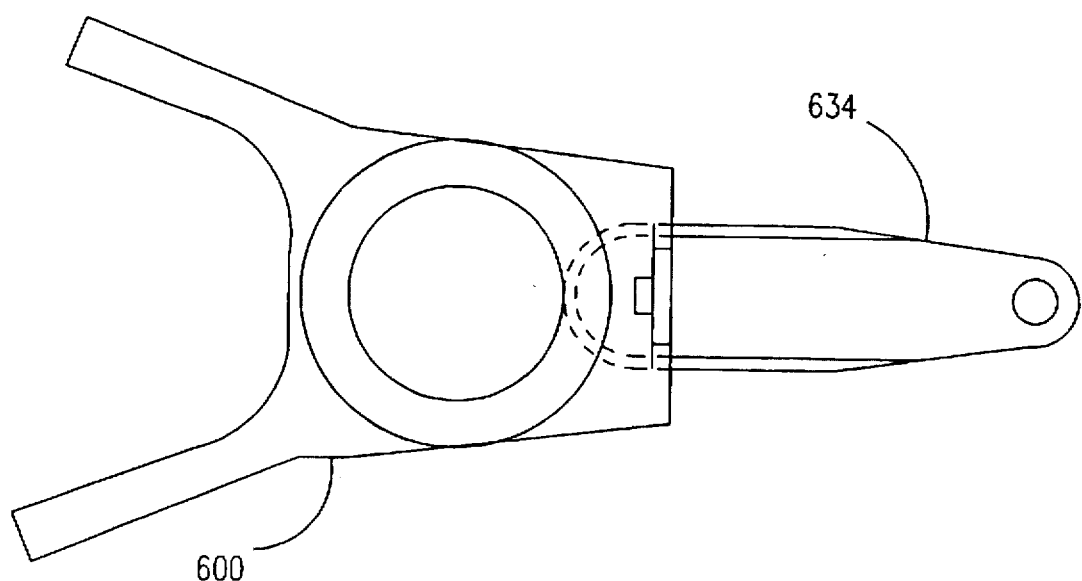
FIG. 43 is a top view of the self-locking arm of FIG. 38 and the actuator member of FIG. 41 in the locked position.

FIG. 43 shows a top view of the arm 634 and the actuator member 600 in the locked position. In order to lock the arm 634 into the actuator member 600, the rear end portion 675 of the arm 634 is aligned with the vertical slot 608 and the V-shaped side wings 678 are aligned with a V-shaped horizontal groove 602. The arm 634 is then pushed along its longitudinal axis toward the actuator member 600 to engage the V-shaped side wings 678 into the V-shaped horizontal grooves 602. The arm 634 is then pushed further inside the vertical slot 608 while the side wings 678 are sliding within the horizontal groove 602 until the vertical wall 680 of the arm 634 comes to rest against the ledge walls 616 of the actuator member 600. The arm 634 is unlocked and removed by pulling it away from the actuator member 600 along its longitudinal axis thereby causing the side wings 678 to disengage from the horizontal grooves 602. The V-shaped side wings 678 have a predetermined size to ensure substantial interference with the V-shaped horizontal grooves 602 in the locked position.

The foregoing detailed description in conjunction with the accompanying drawings shows the nature and advantages of the present invention which is an actuator arm assembly where each actuator arm is independently and individually insertable and removable from the actuator member, thereby providing a method for easy replacement of each damaged or defective arm and head suspension assembly independent of any other head suspension assemblies. Furthermore, each arm has its own self-locking means thereby eliminating the need for any external retaining means. And since each self-locking arm is independently and individually insertable and removable from the actuator member, the arm can be made very thin thereby allowing substantial reduction in disk to disk spacing and the overall height of a disk drive system.

A number of embodiments of the present invention have been described. Nevertheless, it will be understood that various modifications may be made without departing from the spirit and the scope of the invention. For example, protrusions 284, 284", and 336 of the self-locking arms 234, 434, and 334 can be made in different shapes and with different numbers of tabs, dimples, springs, notches, and extensions without departing from the spirit of the invention herein. The boss 80 or the tab 84 of the self-locking arm 34, and 134 can be made of different shapes or replaced by a notch of a different shape. Or, the self-locking means such as boss 80, tab 84, dimples 78 or equivalent thereof can be incorporated into the actuator member instead of incorporating them into the arm without departing from the spirit of the invention herein. Accordingly, it is to be understood that the invention is not to be limited by the specific illustrated embodiments, but only by the scope of the appended claims.

We claim:

1. An actuator arm assembly system, comprising:

at least one actuator arm having a front end portion and a rear end portion; and an actuator member having a first axis, the actuator member having an outer surface having a plurality of arm grooves which run in a direction substantially perpendicular to the first axis, each of the arm grooves having internal walls which are shaped to receive a single actuator arm, one of said arm grooves receiving the rear end portion of said actuator arm, said actuator arm having a rear end portion which does not completely enclose the actuator member when the actuator arm is attached to the actuator member such that the actuator arm is individually and independently removable from said actuator member.

2. The system of claim 1, further comprising an alignment device for aligning the actuator arm relative to the actuator member.

3. The system of claim 2, wherein the alignment device comprises a protuberance of the actuator member which is received by an opening located in the rear end portion of the actuator arm.

4. The system of claim 1, wherein the alignment device comprises an alignment groove in the outer surface of said actuator member running in a direction substantially parallel to the first axis.

5. The system of claim 4, wherein the alignment device further comprises an alignment member on the rear end portion of the actuator arm adapted to engage with the alignment groove of said actuator member.

6. The system of claim 5, wherein the alignment member comprises a boss located on the rear end portion of the actuator arm.

7. The system of claim 4, wherein the alignment device further comprises a pin which is inserted into the alignment groove of said actuator member, said pin is sized to form an interference fit with the alignment groove after insertion and wherein the rear end portion of the actuator arm has an opening to receive the pin.

8. The system of claim 1, wherein the actuator arm has an opening incorporated into the rear end portion of said arm, the opening is adapted to fit within the arm groove of said actuator member.

9. The system of claim 8, wherein said opening is a C-shaped opening having first and second ends.

10. The system of claim 8, wherein said opening is a trapezoidal-shaped opening having first and second extension arms.

11. The system of claim 1, further comprising a locking device for securing the actuator arm to the actuator member.

12. The system of claim 11, wherein the locking device comprises a plurality of dimples located on the rear end portion of the actuator arm, the dimples engaging the arm groove of said actuator member.

13. The system of claim 11, wherein the locking device comprises a tab located on the rear end portion of the actuator arm engaging the arm groove of said actuator member.

14. The system of claim 1, in which said rear end portion of said actuator arm comprises a pair of extension arms.

15. The system of claim 14, wherein each extension arm is located within the arm groove on opposite sides of the actuator arm from the other extension arm.

16. The system of claim 15, wherein each extension arm has a tab member located at its distal end which is received by a recess in an internal wall of the arm groove.

17. A storage system comprising:

at least one actuator arm having a front end portion and a rear end portion;

an actuator member having a first axis, the actuator member having an outer surface having a plurality of arm grooves which run in a direction substantially perpendicular to the first axis, each of the arm grooves having internal walls which are shaped to receive a single actuator arm, one of said arm grooves receiving the rear end portion of said actuator arm, said actuator arm having a rear end portion which does not completely enclose the actuator member when the actuator arm is attached to the actuator member such that the actuator arm is individually and independently removable from said actuator member;

a transducer assembly attached to the actuator arm;

a data storage disk located proximate to the transducer assembly;

a rotation device connected to the disk for rotating the disk; and an actuator device connected to the actuator member for moving the transducer assembly relative to the disk.

18. The system of claim 17, further comprising an alignment device for aligning the actuator arm relative to the actuator member.

19. The system of claim 18, wherein the alignment device comprises a protuberance of the actuator member which is received by an opening located in the rear end portion of the actuator arm.

20. The system of claim 17, wherein the alignment device comprises an alignment groove in the outer surface of said actuator member running in a direction substantially parallel to the first axis.

21. The system of claim 20, wherein the alignment device further comprises an alignment member on the rear end portion of the actuator arm adapted to engage with the alignment groove of said actuator member.

22. The system of claim 21, wherein the alignment member comprises a boss located on the rear end portion of the actuator arm.

23. The system of claim 20, wherein the alignment device further comprises a pin which is inserted into the alignment groove of said actuator member, said pin is sized to form an interference fit with the alignment groove after insertion and wherein the rear end portion of the actuator arm has an opening to receive the pin.

24. The system of claim 17, wherein the actuator arm has an opening incorporated into the rear end portion of said arm, the opening is adapted to fit within the arm groove of said actuator member.

25. The system of claim 24, wherein said opening is a C-shaped opening having first and second ends.

26. The system of claim 24, wherein said opening is a trapezoidal-shaped opening having first and second extension arms.

27. The system of claim 17, further comprising a locking device for securing the actuator arm to the actuator member.

28. The system of claim 27, wherein the locking device comprises a plurality of dimples located on the rear end portion of the actuator arm, the dimples engaging the arm groove of said actuator member.

29. The system of claim 27, wherein the locking device comprises a tab located on the rear end portion of the actuator arm engaging the arm groove of said actuator member.

30. The system of claim 17, in which said rear end portion of said actuator arm comprises a pair of extension arms.

31. The system of claim 30, wherein each extension arm is located within the arm groove on opposite sides of the actuator arm from the other extension arm.

32. The system of claim 31, wherein each extension arm has a tab member located at its distal end which is received by a recess in an internal wall of the arm groove.

* * * * *